United States Patent
Littleford et al.

(10) Patent No.: US 10,927,664 B2
(45) Date of Patent: Feb. 23, 2021

(54) DOWNHOLE DETECTION

(71) Applicant: Welldata (Subsurface Surveillance Systems) Ltd., Fife (GB)

(72) Inventors: Sydney Joseph Littleford, Fife (GB); Christopher Kim Gardiner, South Perth (AU); Duncan Paul Shepherd, Middlesex (GB)

(73) Assignee: WELLDATA (SUBSURFACE SURVEILLANCE SYSTEMS) LTD, Fife (GB)

( * ) Notice: Subject to any disclaimer, the term of this patent is extended or adjusted under 35 U.S.C. 154(b) by 630 days.

(21) Appl. No.: 14/897,937

(22) PCT Filed: Jun. 13, 2014

(86) PCT No.: PCT/GB2014/051836
§ 371 (c)(1),
(2) Date: Dec. 11, 2015

(87) PCT Pub. No.: WO2014/199179
PCT Pub. Date: Dec. 18, 2014

(65) Prior Publication Data
US 2016/0115784 A1    Apr. 28, 2016

(30) Foreign Application Priority Data

Jun. 14, 2013 (GB) ........................... 1310679
Feb. 21, 2014 (GB) ........................... 1403111

(51) Int. Cl.
*E21B 47/13* (2012.01)
*E21B 33/068* (2006.01)
(Continued)

(52) U.S. Cl.
CPC ............ *E21B 47/13* (2020.05); *E21B 33/068* (2013.01); *E21B 33/072* (2013.01);
(Continued)

(58) Field of Classification Search
CPC .... E21B 47/122; E21B 47/003; E21B 47/042; E21B 33/068; E21B 33/072; E21B 43/121; E21B 49/0987; G01V 3/12
(Continued)

(56) References Cited

U.S. PATENT DOCUMENTS 4,210,023 A    7/1980    Sakamoto et al.
4,621,204 A   11/1986    Yashiro et al.
(Continued)

FOREIGN PATENT DOCUMENTS

CN      104035092 A     9/2014
GB        2414611 A    11/2005
(Continued)

OTHER PUBLICATIONS

Agilent Time Domain Analysis Using a Network Analyzer: Application Note 1287-12 (48 pages).
(Continued)

*Primary Examiner* — Matthew R Buck
*Assistant Examiner* — Patrick F Lambe
(74) *Attorney, Agent, or Firm* — Myers Bigel, P.A.

(57) ABSTRACT

A method for use in or for detecting a downhole feature in a well comprises transmitting an electromagnetic signal from a first position located substantially at or adjacent to surface through a first space to the downhole feature. The method further comprises receiving an electromagnetic signal at a second position located substantially at or adjacent to surface after reflection of the transmitted electromagnetic signal from the downhole feature and after propagation of the reflected electromagnetic signal through a second space. The method may comprise sealing the well before transmitting the electromagnetic signal. Such a method may be used
(Continued)

to detector determine a distance from surface to a downhole feature such as a fluid interface in a completed production, injection or observation well.

64 Claims, 11 Drawing Sheets

(51) Int. Cl.
| | |
|---|---|
| *E21B 49/08* | (2006.01) |
| *E21B 33/072* | (2006.01) |
| *E21B 47/003* | (2012.01) |
| *E21B 47/047* | (2012.01) |
| *E21B 43/12* | (2006.01) |
| *G01V 3/12* | (2006.01) |

(52) U.S. Cl.
 CPC .......... *E21B 43/121* (2013.01); *E21B 47/003* (2020.05); *E21B 47/047* (2020.05); *E21B 49/087* (2013.01); *G01V 3/12* (2013.01)

(58) Field of Classification Search
 USPC .................................................. 166/250.03
 See application file for complete search history.

(56) References Cited

U.S. PATENT DOCUMENTS

| | | | |
|---|---|---|---|
| 4,661,817 A | 4/1987 | Bekkadal et al. | |
| 4,926,391 A * | 5/1990 | Rector ................... | G01V 1/375 |
| | | | 367/25 |
| 5,773,984 A | 6/1998 | Suyama et al. | |
| 6,202,485 B1 | 3/2001 | Wien et al. | |
| 6,353,418 B1 | 3/2002 | Burger et al. | |
| 6,414,625 B1 | 7/2002 | Kleman | |
| 6,469,676 B1 | 10/2002 | Fehrenbach et al. | |
| 6,765,524 B2 | 7/2004 | Kleman | |
| 7,030,827 B2 | 4/2006 | Mahler et al. | |
| 7,453,265 B2 * | 11/2008 | Johnstad ............... | E21B 47/042 |
| | | | 324/324 |
| 8,353,677 B2 | 1/2013 | Thompson et al. | |
| 2004/0046573 A1 | 3/2004 | Schroth et al. | |
| 2004/0113853 A1 | 6/2004 | Serban et al. | |
| 2004/0173020 A1 | 9/2004 | Edvardsson | |
| 2006/0000274 A1 | 1/2006 | Kallsand et al. | |
| 2007/0085729 A1 | 4/2007 | Edvardsson | |
| 2008/0062037 A1 | 3/2008 | Edvardsson | |
| 2009/0031578 A1 | 2/2009 | Suzuki et al. | |
| 2009/0128395 A1 | 5/2009 | Baath | |
| 2009/0229359 A1 | 9/2009 | Reimelt et al. | |
| 2009/0302867 A1 | 12/2009 | Schroth et al. | |
| 2009/0315758 A1 | 12/2009 | Jirskog | |
| 2010/0090883 A1 | 4/2010 | Chen et al. | |
| 2010/0231438 A1 | 9/2010 | Ohlsson et al. | |
| 2010/0237871 A1 | 9/2010 | Allouche et al. | |
| 2011/0079402 A1 | 4/2011 | Darby et al. | |
| 2011/0081256 A1 * | 4/2011 | Thompson ............ | E21B 47/042 |
| | | | 417/53 |
| 2011/0209540 A1 | 9/2011 | Banks et al. | |
| 2012/0084055 A1 | 4/2012 | Smithson | |
| 2012/0153969 A1 | 6/2012 | Eckert et al. | |
| 2012/0169528 A1 | 7/2012 | Edvardsson et al. | |
| 2012/0242532 A1 | 9/2012 | Fouarge et al. | |
| 2012/0280852 A1 | 11/2012 | Allouche et al. | |
| 2012/0319891 A1 | 12/2012 | Edvardsson et al. | |
| 2013/0009803 A1 | 1/2013 | Edvardsson | |
| 2013/0108474 A1 | 5/2013 | Thompson et al. | |
| 2013/0299165 A1 * | 11/2013 | Crow ..................... | E21B 33/12 |
| | | | 166/250.08 |
| 2014/0083183 A1 | 3/2014 | Edvardsson | |
| 2014/0085132 A1 | 3/2014 | Jirskog et al. | |
| 2015/0168201 A1 | 6/2015 | Cobianu et al. | |
| 2015/0168247 A1 | 6/2015 | Gundersen | |
| 2015/0276460 A1 | 10/2015 | Georgescu et al. | |
| 2015/0377678 A1 | 12/2015 | Edvardsson | |
| 2015/0377680 A1 | 12/2015 | Edvardsson et al. | |
| 2016/0103008 A1 | 4/2016 | Edvardsson et al. | |

FOREIGN PATENT DOCUMENTS

| | | |
|---|---|---|
| GB | 2463890 A | 3/2010 |
| JP | 3-272488 A | 12/1991 |
| JP | 2012-215427 A | 11/2012 |
| KR | 10-1411573 B1 | 6/2014 |
| WO | WO 01/53851 A1 | 7/2001 |
| WO | WO 2004/083790 A1 | 9/2004 |
| WO | WO 2011/044023 A2 | 4/2011 |
| WO | WO 2012/151488 A1 | 11/2012 |

OTHER PUBLICATIONS

Geib "Inspection of Cased Pipe by Guided Electromagnetic Wave Technology", *AGA Corrosion Committee Meeting* (2008) (48 pages).
Dr.-Ing. Detlef Brumbl "Fundamentals of Radar Technology for Level Gauging", *Krohne Messtechnik GmbH & Co. KG* 4$^{th}$ Ed. (65 pages).
Sam et al. "SEP 145434 Fully automated Fluid Level Measurement Tool", *Society of Petroleum Engineers* 12 pages (2011).
K. Wang et al. "Ultrasonic and Electromagnetic Sensors for Downhole Reservoir Characterization", *Proceedings, Thirty-Sixth Workshop on Geothermal Reservoir Engineering Stanford University* 7 pages (2011).
X. Wang "Acoustic Reflectometry for Gas Pipelines—Monitoring Features in Gas Pipelines Using Acoustek®", 7 pages.
Search Report corresponding to British Application No. GB 1310679.4 dated Jan. 9, 2014.
Search Report corresponding to British Application No. GB 1410628.0 dated Oct. 20, 2014.
International Search Report corresponding to International Application No. PCT/GB2014/051836 dated Jul. 6, 2015.
Skinner (Rozendal Associates, Inc.), Schematic Drawing—Lens Corrected Conical Horn, Sep. 27, 2002, 1 p.
Patents Act 1977: Combined Search and Examination Report under Sections 17 and 18(3), GB Application No. 1520749.1, dated May 31, 2016, 6 pp.
Patents Act 1977: Combined Search and Examination Report under Sections 17 and 18(3), GB Application No. 1420938.1, dated Feb. 26, 2015, 5 pp.
Yu et al., "High-Performance Circuilar $TE_{01}$-Mode Converter", *IEEE Transactions on Microwave Theory and Techniques*, vol. 53, No. 12, Dec. 2005, pp. 3794-3798.

\* cited by examiner (a)

(b)

DOWNHOLE DETECTION

RELATED APPLICATIONS

This application is a 35 U.S.C. § 371 national stage application of PCT Application No. PCT/GB2014/051836, filed on Jun. 13, 2014, which claims priority from British Application No. 1310679.4 filed on Jun. 14, 2013 and British Application No. 1403111.6 filed on Feb. 21, 2014, the contents of each of which are incorporated herein by reference in their entireties. The above-referenced PCT International Application was published as International Publication No. WO 2014/199179 A2 on Dec. 18, 2014.

FIELD OF INVENTION

The present invention relates to downhole detection. In particular, though not exclusively, the invention relates to a method, system, apparatus and device for downhole detection or for detecting a downhole feature or features in an oil, gas and/or water well, for example a subsea or offshore well. The method may, for example, find use in detecting one or more fluid interfaces in a completed oil, gas or water well.

BACKGROUND TO INVENTION

It is often desirable to measure a level of one or more fluids within a completed oil, gas and/or water well. The term "completed" is typically understood in the art to refer to a well which has been drilled and which may be sealed and/or capable of production. For example, it is often desirable to measure the level of oil, water and/or gas in such wells. This may be important when controlling flow rates of hydrocarbon fluids through an oil, gas and/or water well from a hydrocarbon-bearing formation surrounding the oil, gas and/or water well and/or when seeking to maximise the efficiency of production of hydrocarbon fluids from the oil, gas and/or water well. In this regard, it may be important to discriminate between the level of an interface existing between a layer of water and a layer of oil and/or the level of an interface existing between a layer of oil and a layer of gas. This may be useful when seeking to at least partially reduce the production of water to surface or when seeking to control the amount of gas produced in an oil, gas and/or water well for enhanced production of oil. It may also be desirable to measure the level of a fluid within an injection well when injecting a fluid such as water or a gas through the injection well.

It is also known to use a downhole pump in an oil, gas or water well to provide so-called artificial lift for fluids such as hydrocarbon fluids or water to surface. If the fluid levels in the well are permitted to fall below the level of a downhole pump, the pump may become susceptible to wear or damage or may malfunction or burn out. Thus, it may be important to have accurate real-time measurements of fluid levels in an oil, gas or water well relative to a downhole pump.

WO 2012/151488 (CHEVRON U.S.A. INC.). discloses a first distance measurement method in which electromagnetic pulses are transmitted to a fluid interface in an oil, gas and/or water well, wherein the electromagnetic pulses have a frequency in the range of 3 MHz to 100 MHz. Distance information is determined from the round-trip travel time of the pulses from the transmitter to the fluid interface and back to the receiver. A second distance measurement method is disclosed in which a pair of different frequency tones are transmitted to a fluid interface in an oil, gas and/or water well and the distance to the fluid interface is determined from the phase difference between respective signals reflected from the fluid interface for each frequency tone. For distances of 500 m, such methods may only be used for signals of frequencies of the order of 300 kHz. Such methods may, however, provide limited fluid level measurement accuracy and/or resolution. In each distance measurement method, electromagnetic signals are transmitted along an electrically conductive coaxial path defined by an electrically conductive length of tubing located centrally within an electrically conductive length of casing to a fluid interface and the reflection of the electromagnetic pulses back along essentially the same coaxial path to a receiver. Such methods cannot be used in an uncased borehole or may provide unreliable or inaccurate fluid level measurements in the event of breaks in the conductivity of the casing. Such methods may provide unreliable or inaccurate fluid level measurements in the event that the tubing were to contact the casing or in the event that an electrically conductive object or obstruction were to bridge a gap between the tubing and the casing.

U.S. Pat. No. 7,453,265 (JOHNSTAD et al.) discloses the use of a Time Domain Reflectometry (TDR) method which relies upon the transmission of an electromagnetic signal having a frequency in the range of 1 kHz to 10 MHz for monitoring the position of an oil/water contact relative to a downhole toroidal transmitter antenna located in a production zone within an annulus defined between the outside of a conductive tubing string and the inside of a casing pipe. Modelling results predict an attenuation of 40 dB for signal transmission down to 100 m where the oil-water contact occurs. Such a measurement method may have limited measurement sensitivity and/or limited measurement range. Such a method relies upon the use of signal conductors to convey a signal generated by a generator downhole through a packer to the downhole transmitter antenna and to convey a signal received by a receiver antenna through the packer uphole to a receiver and analyser arrangement. Signal conductors can be time-consuming and costly to install and/or manage.

SUMMARY OF INVENTION

It should be understood that one or more of the features disclosed in relation to one aspect may apply alone or in any combination in relation to any other aspect.

According to a first aspect of the present invention there is provided a method for use in of for detecting a downhole feature in a well comprising:

transmitting an electromagnetic signal from a first position located substantially at or adjacent to surface through a first space to the downhole feature;

receiving an electromagnetic signal at a second position located substantially at or adjacent to surface after reflection of the transmitted electromagnetic signal from the downhole feature and after propagation of the reflected electromagnetic signal through a second space.

The well may comprise an oil, gas and/or water well.

The well may be configured for production, injection, observation or disposal of a fluid such as oil, gas and/or water.

The method may comprise sealing the well before transmitting the electromagnetic signal.

The method may comprise installing completion infrastructure in the well and/or at a head of the well before transmitting the electromagnetic signal.

The method may comprise installing a valve or valve arrangement at a head of the well (or wellhead) before transmitting the electromagnetic signal.

The method may comprise installing a Christmas tree at a head of the well before transmitting the electromagnetic signal.

The method may comprise pressurising the well before transmitting the electromagnetic signal.

The method may comprise exposing the well to a fluid pressure existing within a sub-surface formation located adjacent to the well before transmitting the electromagnetic signal.

The method may comprise producing a fluid from the well before, during and/or after transmitting the electromagnetic signal.

The method may comprise injecting a fluid into the well before, during and/or after transmitting the electromagnetic signal.

The surface may define the mouth, opening or head of the well.

The surface may define the mouth, opening or head of a borehole of the well.

Surface level may comprise ground level or a level of the seabed.

One or both of the first and second positions may be located at or adjacent a head of the well.

One or both of the first and second positions may be located at, adjacent or within a wellhead.

One or both of the first and second positions may be located at, adjacent or within a device or infrastructure mounted at a head of the well.

One or both of the first and second positions may both be located at, adjacent or within a Christmas tree.

The first space may extend from a position located substantially at or adjacent to surface to a position located substantially at or adjacent to the downhole feature.

The second space may extend from the position located substantially at or adjacent to the downhole feature to a position located substantially at or adjacent to surface.

The first space and the second space may be the same space.

The method may comprise determining a distance between the transmitter and the receiver from the transmitted and received electromagnetic signals.

The method may comprise determining a distance between surface and the downhole feature from the transmitted and received electromagnetic signals. For example, the method may comprise determining the distance between surface and the downhole feature as half of the distance between the transmitter and the receiver.

The method may comprise determining a rate of change of distance between surface and the downhole feature from the transmitted and received electromagnetic signals.

Such a method does not rely upon the use of signal conductors to convey signals from surface downhole and/or uphole to surface. Such a method does not rely upon propagation along an electrically conductive coaxial path provided by downhole tubing and downhole casing.

Such a method may provide enhanced distance measurement sensitivity, range, accuracy and/or resolution relative to known fluid level measurement methods in oil, gas and/or water wells.

Such a method may permit the measurement of distance between surface and a downhole feature in a completed oil, gas and/or water well.

Such a method may permit the measurement of distance between surface and a downhole feature in a production, injection or observation well.

Such a method may permit the measurement of distance between surface and a downhole feature in an oil, gas and/or water well during completion of the well.

Such a method may permit the measurement of distance between surface and a downhole feature in an oil, gas and/or water well before, during and/or after production of one or more fluids from the well.

Such a method may permit the measurement of distance between surface and a downhole feature in an oil, gas and/or water well before, during and/or after artificial lift of one or more fluids from the well.

Such a method may permit the measurement of distance between surface and a downhole feature in an oil, gas and/or water well during injection of one or more fluids into the well.

The oil, gas and/or water well may comprise steel, glass reinforced and/or composite tubulars or pipes. The composite tubulars or pipes may be or may comprise a composite of Glass Reinforced Epoxy (GRE) and steel. The first and/or second spaces may be enclosed and sealed tubular or annular volumes. The first and/or second spaces may be pressurised. The first and/or second spaces may contain fluids and/or gasses at various temperatures and pressures. The temperature and pressure gradients within the first and/or second spaces may depend upon reservoir and fluid temperatures and pressures and/or other well dynamics.

The first and/or second spaces may be at least partially filled with one or more fluids. For example, the first and/or second spaces may be at least partially filled with at least one liquid and/or at least one gas. The first and/or second spaces may be at least partially filled with a mixture of liquids and/or a mixture of gases. The first and/or second spaces may be at least partially filled with a gas such as a hydrocarbon gas. The first and/or second spaces may be at least partially filled with a mixture of gases. For example, the first and/or second spaces may be at least partially filled with air. The first and/or second spaces may be at least partially filled with a mixture of hydrocarbon gases. The first and/or second spaces may be at least partially filled with oil. The first and/or second spaces may be at least partially filled with water.

The step of determining the distance between surface and the downhole feature from the transmitted and received electromagnetic signals may require knowledge of a composition of a fluid or of each fluid present in the first and second spaces.

The step of determining the distance between surface and the downhole feature from the transmitted and received electromagnetic signals may require knowledge of a permittivity of a fluid or of each fluid present in the first and second spaces. The well may comprise a borehole.

The well may be a completed well. For example, the well may be sealed and/or may be capable of production.

The well may comprise completion infrastructure in the well and/or at a head of the well. For example, the well may comprise a valve or valve arrangement for sealing the well. The valve or valve arrangement may be located at or adjacent to a head of the well or wellhead. The well may comprise a wellhead device or wellhead infrastructure mounted at a head of the well for sealing the well. The well may comprise a Christmas tree.

The well may comprise a downhole tubular.

The first and second spaces may be defined by and/or around the downhole tubular.

The downhole tubular may be arranged around a periphery of the borehole. The downhole tubular may comprise at least one of a casing, a liner and the like.

The downhole tubular may be separated from the borehole.

The downhole tubular and the borehole may define an annulus therebetween.

The downhole tubular may be located centrally within the borehole.

The downhole tubular may comprise a tubing string. The tubing string may be provided within and/or suspended within the well.

The downhole tubular may comprise at least one of production tubing, a work string, a drill string and the like.

At least one of the first and second spaces may be defined by the downhole tubular.

At least one of the first and second spaces may be defined internally of the downhole tubular.

At least one of the first and second spaces may be defined externally of the downhole tubular.

At least one of the first and second spaces may be defined within an annulus defined between a downhole tubular located centrally within the borehole and a downhole tubular arranged around a periphery of the borehole.

The downhole feature may be spatially localised within the well.

The downhole feature may comprise a discontinuity.

The downhole feature may comprise an interface.

The downhole feature may comprise a fluid interface such as a gas-liquid interface, a gas-gas interface or a liquid-liquid interface. The method may comprise determining a distance between surface and the fluid interface from the transmitted and received electromagnetic signals.

The method may comprise determining a rate of change of distance between surface and the fluid interface from the transmitted and received electromagnetic signals.

The downhole feature may comprise an interface between a gas and a liquid.

The downhole feature may comprise an interface between two different types of liquid.

The downhole feature may comprise an interface between two different types of gas.

The method may comprise determining an amount of fluid in the well.

The method may comprise determining a rate of change of fluid level in the well.

The method may comprise:
transmitting an electromagnetic signal from surface to a fluid interface;
receiving an electromagnetic signal at surface after reflection of the transmitted electromagnetic signal from the fluid interface; and
determining a distance between surface and the fluid interface from the transmitted and received electromagnetic signals.

The downhole feature may comprise a gas-oil interface.

The method may comprise determining a distance between surface and a gas-oil interface from the transmitted and received electromagnetic signals.

The method may comprise determining a rate of change of distance between surface and the gas-oil interface from the transmitted and received electromagnetic signals.

The downhole feature may comprise an oil-water interface.

The method may comprise determining a distance between surface and an oil-water interface from the transmitted and received electromagnetic signals.

The method may comprise determining a rate of change of distance between surface and the oil-water interface from the transmitted and received electromagnetic signals.

The downhole feature may comprise an air-hydrocarbon gas interface.

The method may comprise determining a distance between surface and an air-hydrocarbon gas interface from the transmitted and received electromagnetic signals.

The method may comprise determining a rate of change of distance between surface and the air-hydrocarbon gas interface from the transmitted and received electromagnetic signals.

The method may comprise determining an amount of oil, gas and/or water in the well.

The method may comprise determining a rate of change of an oil, gas or water level in the well.

The method may comprise using the determined distance to the fluid interface to determine a degree and/or rate of thermal transfer between a fluid in a steam injection well and a fluid in a subterranean formation which surrounds the steam injection well. This may be important when trying to control a rate of production of a fluid such as a hydrocarbon fluid from a production well which is in fluid flow communication with the same subterranean formation which surrounds the steam injection well. Known Distributed Temperature Sensing (DTS) systems are either incapable of, or cannot readily or accurately determine a distance to a fluid interface in a well. In particular, known DTS systems are either incapable of, or cannot readily or accurately determine a distance to a fluid interface in a steam injection well.

The downhole feature may comprise a change in an inner diameter of a downhole tubular.

The downhole feature may comprise a change in a wall thickness of a downhole tubular.

The downhole feature may comprise a coupling between two downhole tubulars.

The downhole feature may comprise at least a part of a downhole tool.

The downhole feature may comprise at least a part of a downhole valve.

The downhole feature may comprise at least part of a downhole valve member.

The downhole feature may comprise a downhole object, obstruction, impairment, restriction, occlusion or the like.

The downhole feature may comprise at least one of particulates, sand, hydrates, wax, scale, corrosion and the like within the well.

The downhole feature may be deposited on a surface of a downhole tubular.

The downhole feature may be spatially distributed. The method may comprise exciting, launching or otherwise transmitting the electromagnetic signal as a TE mode.

The method may comprise exciting, launching or otherwise transmitting the electromagnetic signal as a TE01 mode.

A TE01 mode may have lower propagation losses than other guided electromagnetic modes. Such a method may provide enhanced distance measurement sensitivity and/or enhanced distance measurement range compared with a method which uses a different guided electromagnetic mode.

The transmitted electromagnetic signal may have a frequency in a frequency range of 1 GHz to 100 GHz, 2 GHz to 50 GHz, 4 GHz to 40 GHz, or 20 GHz to 60 GHz. The use of such frequencies may provide enhanced distance measurement sensitivity, range, accuracy and/or resolution relative to known distance measurement methods.

Such frequencies may be propagated in a space defined by or around at least one of a standard tubular, pipe, casing, liner and like commonly used in the oil and gas industry.

Such frequencies may be propagated in a space defined by or around a control line commonly used in the oil and gas industry.

The method may comprise transmitting the electromagnetic signal with a plurality of different frequencies.

The method may comprise transmitting the electromagnetic signal with at least 10 different frequencies, at least 100 different frequencies, at least 1,000 different frequencies, or at least 10,000 different frequencies.

The method may comprise transmitting the electromagnetic signal with a multitude of different frequencies.

The use of a multitude of different frequencies may provide enhanced distance measurement accuracy, resolution, sensitivity and/or range relative to known distance measurement methods.

The method may comprise transmitting the plurality of different frequencies sequentially.

The method may comprise altering the electromagnetic signals received for each of the different frequencies to correct or account for any differences in propagation speed of the different frequencies. The sequential transmission of the plurality of different frequencies may allow or facilitate such correction. Such correction may provide enhanced distance measurement accuracy, resolution, sensitivity and/or range relative to known distance measurement methods.

The method may comprise using a software algorithm to alter the electromagnetic signals received for each of the different frequencies to correct or account for any differences in propagation speed of and/or distance travelled by the different frequencies.

The method may comprise repeatedly sweeping the frequency of the transmitted electromagnetic signal through each of the plurality of different frequencies.

The method may comprise continuously sweeping the frequency of the transmitted electromagnetic signal through each of the plurality of different frequencies.

The method may comprise transmitting and/or receiving pulsed electromagnetic signals.

The method may comprise transmitting and/or receiving continuous wave electromagnetic signals.

The method may comprise transmitting one or more of the plurality of different frequencies simultaneously.

The method may comprise measuring a magnitude of the received electromagnetic signal as a function of frequency.

The method may comprise measuring a phase of the received electromagnetic signal as a function of frequency.

The method may comprise measuring a magnitude of the transmitted electromagnetic signal as a function of frequency.

The method may comprise measuring a phase of the transmitted electromagnetic signal as a function of frequency.

The method may comprise determining a magnitude frequency spectrum from the magnitude of the received electromagnetic signal and the magnitude of the transmitted electromagnetic signal as a function of frequency.

The method may comprise determining the magnitude frequency spectrum from a ratio of the magnitude of the received electromagnetic signal to the magnitude of the transmitted electromagnetic signal as a function of frequency.

The method may comprise using a Vector Network Analyser (VNA) or similar measuring device to determine the magnitude frequency spectrum.

The method may comprise determining a phase frequency spectrum from the phase of the received electromagnetic signal and the phase of the transmitted electromagnetic signal as a function of frequency.

The method may comprise determining the phase frequency spectrum from a difference between the phase of the received electromagnetic signal and the phase of the transmitted electromagnetic signal as a function of frequency.

The method may comprise using a Vector Network Analyser (VNA) to determine the phase frequency spectrum.

The method may comprise determining a time domain reflectance trace from the magnitude frequency spectrum and the phase frequency spectrum.

Such a time domain reflectance trace may provide an indication of the time that would be taken by an electromagnetic pulse to travel from surface to the downhole feature and back to surface. Such a time domain reflectance trace is not, however, measured by transmitting electromagnetic pulses from surface to the downhole feature and back to surface.

The method may comprise using an inverse Fourier transform to determine a time domain reflectance trace from the magnitude frequency spectrum and the phase frequency spectrum.

The use of such a Frequency Domain Reflectometry (FDR) method may provide a time domain reflectance trace with less noise than other known distance measurement methods. This may provide enhanced distance measurement accuracy, resolution, sensitivity and/or range.

The method may comprise using a Vector Network Analyser (VNA) to determine the time domain reflectance trace.

The method may comprise determining the distance between surface and the downhole feature from the time domain reflectance trace.

The method may comprise determining the distance between surface and the downhole feature from a temporal delay associated with a reflectance feature in the time domain reflectance trace.

The method may comprise determining a nature of the downhole feature from a configuration of one or more reflectance features in the time and/or frequency domain reflectance trace.

The method may comprise determining a nature of the downhole feature from the size and/or shape of a reflectance profile or peak in the time and/or frequency domain reflectance trace, magnitude frequency spectrum and/or phase frequency spectrum.

The method may comprise determining a dielectric property of the downhole feature from the received or reflected electromagnetic signal. The dielectric property may be permittivity, dielectric constant or the like. For example, the dielectric property may be permittivity across a range of frequencies. Dielectric spectroscopy techniques may be applied to determine the dielectric property from the received electromagnetic signal. The dielectric spectroscopy techniques may utilise the time and/or frequency domains. The time domain reflectance trace, magnitude frequency spectrum and/or phase frequency spectrum may be used to determine the dielectric property. Time Domain Reflectometry (TDR) or Time Domain Spectroscopy (TDS) may be used to determine the dielectric property from the received electromagnetic signal.

The method may comprise determining a dielectric property of a material comprised within or present at the downhole feature. The method may comprise determining a dielectric property of a material present at an interface of the downhole feature, for example, at a gas-oil or water-oil interface. The received electromagnetic signal may comprise a reflected signal from the material. The profile, shape and/or amplitude of the reflected signal from the material may allow the determination of the dielectric property of that material. The method may comprise using dielectric spectroscopy in the time and/or frequency domain(s) to determine the dielectric property, for example the method may comprise using TDR or TDS techniques. The method may allow fast and accurate identification of the composition of one or more materials comprised within or present at the downhole feature.

The method may comprise determining the distance between surface and the downhole feature from a frequency of the received electromagnetic signal.

The method may comprise determining the distance between surface and the downhole feature by comparing a frequency of the received electromagnetic signal to a frequency of the transmitted electromagnetic signal.

The method may comprise mixing at least a portion of a transmitted signal with at least a portion of a received signal to produce a beat signal.

The method may comprise mixing at least a portion of the transmitted electromagnetic signal with at least a portion of the received electromagnetic signal to produce a beat electromagnetic signal.

The method may comprise mixing at least a portion of an electrical signal transmitted to an antenna to produce the transmitted electromagnetic signal with at least a portion of a received electrical signal produced on receipt of the received electromagnetic signal at an antenna to produce a beat electrical signal.

The method may comprise demodulating the beat signal.

The method may comprise determining the distance between surface and the downhole feature from a magnitude of the demodulated beat signal.

Such a frequency-modulated continuous wave (FMCW) method may be simpler and, therefore, more cost effective to implement than a Frequency Domain Reflectometry (FDR) method.

The method may comprise repeatedly determining the distance between surface and the downhole feature.

The method may comprise continuously monitoring the distance between surface and the downhole feature.

Such a method may permit real-time or dynamic measurements of a level of a fluid interface. This may be useful for real-time control of fluid production or injection. This may be useful for real-time control of a downhole device such as a downhole pump.

The method may comprise controlling a downhole device according to a determined distance between surface and the downhole feature. For example, the method may comprise controlling a pump such as a gas-lift or Electric Submersible Pump (ESP) according to a determined distance between surface and the downhole feature.

The method may comprise disabling or powering down a downhole device according to a determined distance between surface and the downhole feature. For example, the method may comprise disabling or powering down a pump such as a gas-lift or Electric Submersible Pump (ESP) according to a determined distance between surface and the downhole feature.

The method may comprise using a determined distance between surface and a fluid interface to determine a pressure at the fluid interface.

The method may comprise using a known pressure at surface within the well, and a known specific gravity of any fluids located between surface and the fluid interface to determine the pressure at the fluid interface.

Such a method may provide a wireless, non-invasive solution for measuring downhole pressure.

The method may comprise using the determined pressure at the fluid interface to determine a rate of change of fluid pressure at the fluid interface. Such a method may provide an indication of a pressure change such as a pressure build-up.

The method may comprise using the determined distance between surface and a gas-oil interface to determine a pressure at the gas-oil interface.

The method may comprise using the determined distance between surface and an oil-water interface to determine a pressure at the oil-water interface.

The method may comprise using the determined distance between surface and a gas-water interface to determine a pressure at the gas-water interface.

Such a method may be combined with other measurement techniques such as acoustic measurement techniques to provide more information about the downhole feature and/or the downhole environment.

The method may comprise receiving an electromagnetic signal at surface after reflection of the transmitted electromagnetic signal from a plurality of downhole features within the well. For example, each of the downhole features may comprise a different downhole fluid interface.

The method may comprise determining a distance between surface and each of the downhole features.

The method may comprise determining a distance between surface and each of the downhole features from a time domain reflectance trace determined from a magnitude frequency spectrum and a phase frequency spectrum obtained from the transmitted and reflected electromagnetic signals.

The method may comprise determining a distance between surface and at least one of a gas-oil interface, an oil-water interface and a gas-water interface.

The method may comprise determining the thickness of a layer of oil in the well from the distance between surface and a gas-oil interface and the distance between surface and an oil-water interface.

The method may comprise using the determined distance between surface and the gas-oil interface and the determined distance between surface and the oil-water interface to determine a pressure at the oil-water interface.

The method may comprise using a known pressure at surface within the well, and a known specific gravity of the oil to determine a pressure at the oil-water interface. Such a method may be useful for monitoring a downhole pressure in the well.

The method may comprise using the determined pressure at the oil-water interface to determine a rate of change of fluid pressure at the oil-water interface. Such a method may provide an indication of a pressure change such as a pressure build-up.

The method may comprise determining the dielectric properties of the surface reflecting the transmitted electromagnetic signals.

According to a second aspect of the present invention there is provided a system for use in or for detecting a downhole feature in a well comprising:

a transmitter antenna for transmitting an electromagnetic signal from a first position located substantially at or adjacent to surface through a first space;

a receiver antenna for receiving an electromagnetic signal at a second position located substantially at or adjacent to surface after reflection of the transmitted electromagnetic signal from the downhole feature and after propagation of the reflected electromagnetic signal through a second space.

The system may comprise a controller for determining a distance between surface and the downhole feature from the transmitted and received electromagnetic signals.

The system may comprise a transmitter operatively coupled to the transmitter antenna.

The transmitter antenna may be directional.

The transmitter antenna may be configured to preferentially excite or launch a TE01 electromagnetic mode into the first space.

The transmitter antenna may comprise at least one of a horn antenna, a parabolic antenna and the like.

The transmitter antenna may extend into or be directed towards an end of the downhole tubular.

The transmitter antenna may be configured to transmit an electromagnetic signal along a longitudinal direction of the downhole tubular.

The transmitter antenna may be configured to transmit an electromagnetic signal along a direction other than the longitudinal direction of the downhole tubular.

Such an arrangement may require that the transmitted electromagnetic signal undergoes one or more changes of direction after transmission from the transmitter antenna but before propagation through the first space.

The system may comprise a director which is configured to direct the transmitted electromagnetic signal into the first space.

The director may, for example, comprise a reflector.

Such an arrangement may be necessary depending on the geometry of a wellhead device or wellhead infrastructure located at a head of the well. Such an arrangement may be necessary depending on the geometry of a Christmas tree at the wellhead. Such an arrangement may be necessary where it is desired that the transmitted electromagnetic signal propagates along an annulus.

The transmitter antenna may be configured to transmit an electromagnetic signal along a direction which is substantially perpendicular to the longitudinal direction of the downhole tubular.

The system may comprise a receiver operatively coupled to the receiver antenna.

The receiver antenna may be directional.

The receiver antenna may be configured to preferentially receive a TE01 electromagnetic mode from the second space.

The receiver antenna may comprise at least one of a horn antenna, a parabolic antenna and the like.

The receiver antenna may extend into or be directed towards an end of the downhole tubular.

The receiver antenna may be configured to receive an electromagnetic signal along a longitudinal direction of the downhole tubular.

The receiver antenna may be configured to receive an electromagnetic signal along a direction other than the longitudinal direction of the downhole tubular.

Such an arrangement may require that the received electromagnetic signal undergoes one or more changes of direction after propagation through the second space but before being received by the receiver.

The system may comprise a director which is configured to direct the electromagnetic signal from the second space towards the receiver.

The director may, for example, comprise a reflector.

Such an arrangement may be necessary depending on the geometry of a device or of infrastructure mounted at a head of the well. Such an arrangement may, for example, be necessary depending on the geometry of a surface casing or tubing arrangement at a wellhead. Such an arrangement may be necessary depending on the geometry of a Christmas tree located at the wellhead. Such an arrangement may be necessary where it is desired that the received electromagnetic signal propagates along an annulus.

The receiver antenna may be configured to receive an electromagnetic signal along a direction which is substantially perpendicular to the longitudinal direction of the downhole tubular.

The transmitter and receiver antennas may be the same antenna.

The system may comprise a coupler, a splitter, a circulator or the like for separating the received electromagnetic signal from the transmitted electromagnetic signal.

The transmitter and receiver antennas may be separate. The use of separate transmitter and receiver antennas may serve to reduce cross-talk and/or improve isolation.

At least one of the transmitter and receiver antennas may be at partially defined by, or may be partially or wholly integrally formed with, a wellhead device or wellhead infrastructure located at a head of the well.

At least one of the transmitter and receiver antennas may be at partially defined by, or may be partially or wholly integrally formed with, a Christmas tree located at a head of the well.

The system may comprise a cap arrangement.

The cap arrangement may be configured for use with a device or for infrastructure mounted at a head of the well. The cap arrangement may be configured for use with a surface casing or tubing arrangement at a wellhead. The cap arrangement may be configured for use with a Christmas tree.

The cap arrangement may be configured to be retro-fitted to an industry-standard device or to industry-standard infrastructure mounted at a head of the well. The cap arrangement may be configured to be retro-fitted to an industry standard Christmas tree.

The cap arrangement may be configured for fitting into an opening of a wellhead device or an opening of wellhead infrastructure.

The opening of the wellhead device or the wellhead infrastructure may comprise an opening of a through bore of the wellhead device or the wellhead infrastructure. Such a cap arrangement may permit transmission and/or reception of electromagnetic signals to/from a tubular located arranged around a periphery of the borehole or a tubular located centrally within the borehole.

The opening of the wellhead device or the wellhead infrastructure may comprise a side port of a wellhead device or the wellhead infrastructure. Such a cap arrangement may permit transmission and/or reception of electromagnetic signals to/from an annulus.

The cap arrangement may be configured to seal an opening of the wellhead device or an opening of wellhead infrastructure.

The cap arrangement may comprise a seal for sealing the cap arrangement relative to the wellhead device or the wellhead infrastructure.

The cap arrangement may be configured to accommodate a first electrical conductor for providing an electrically conductive connection between the transmitter and the transmitter antenna.

The cap arrangement may be configured to accommodate a second electrical conductor for providing an electrically conductive connection between the receiver antenna and the receiver.

The first and second electrical conductors may be the same electrical conductor.

The cap arrangement may comprise a cap member.

The transmitter and/or receiver antennas may extend from the cap member.

The cap member may comprise a seal member.

The seal member may be carried by, attached to or mounted on the cap member.

The seal member may be annular.

The seal member may comprise an O-ring.

The seal member may be accommodated in an annular groove formed in an outer diameter of the cap member.

The cap member may be configured to engage, to fit within, and/or to fit onto an opening of the wellhead device or wellhead infrastructure.

The cap member may be configured to engage and/or to fit within a bore such as the main bore of the wellhead device or wellhead infrastructure.

The cap member may be configured to engage and/or to fit within a flow path, port or conduit, such as a lateral or side flow path, a lateral or side port, or a lateral or side conduit of the wellhead device or wellhead infrastructure.

The cap member may be attachable to the wellhead device or wellhead infrastructure. This may allow the cap member to be retrofitted to a wellhead device or wellhead infrastructure. The wellhead device or wellhead infrastructure may comprise an industry-standard wellhead device or wellhead infrastructure such as an industry-standard Christmas tree.

The cap arrangement may comprise a fastening arrangement for attaching the cap member to the wellhead device or the wellhead infrastructure.

The fastening arrangement may comprise a locking member such as a locking ring or the like. The locking member may define a screw thread for coupling with a complementary screw thread of the wellhead device or the wellhead infrastructure.

The fastening arrangement may comprise one or more fasteners. The one or more fasteners may extend from the cap member to the wellhead device or the wellhead infrastructure.

The cap member may comprise a flange for attaching to a further flange of the wellhead device or wellhead infrastructure. For example the cap member may comprise a flange for attaching to a further flange of a lateral or side port of the wellhead device or wellhead infrastructure.

The transmitter and/or receiver antennas may be configured to extend from the cap member into the through bore of the wellhead device or the wellhead infrastructure.

The transmitter and/or receiver antennas may be configured to extend from the cap member into the through bore of the wellhead device or the wellhead infrastructure past a lateral path which extends laterally from the through bore of the wellhead device or the wellhead infrastructure.

The transmitter and/or receiver antennas may be configured to extend from the cap member into the through bore of the wellhead device or the wellhead infrastructure past a flow path and/or past a kill path defined within the wellhead device or the wellhead infrastructure.

Such transmitter and/or receiver antennas may serve to prevent any spurious reflections of the transmitted electromagnetic signal from the lateral path.

According to a third aspect of the present invention there is provided a cap arrangement for a wellhead device or wellhead infrastructure, the cap arrangement comprising or at least partially defining an antenna.

The wellhead device or wellhead infrastructure may comprise a Christmas tree.

The cap arrangement may be configured for sealing an opening of a wellhead device or an opening of wellhead infrastructure.

The cap arrangement may comprise a cap member.

The antenna may be provided with, attached to, mounted on, suspended from, accommodated within, at least partially defined by, and/or integrally formed with, the cap member.

The cap member may be configured to engage, to fit within, and/or to fit onto an opening of the wellhead device or wellhead infrastructure.

The cap member may be configured to engage and/or to fit within a bore such as the main bore of the wellhead device or wellhead infrastructure.

The cap member may be configured to engage and/or to fit within a flow path, port or conduit, such as a lateral or side flow path, a lateral or side port, or a lateral or side conduit of the wellhead device or wellhead infrastructure.

The cap member may be attachable to the wellhead device or wellhead infrastructure. This may allow the cap member to be retrofitted to a wellhead device or wellhead infrastructure. The wellhead device or wellhead infrastructure may comprise an industry-standard wellhead device or wellhead infrastructure such as an industry-standard Christmas tree.

The cap arrangement may comprise a fastening arrangement for attaching the cap member to the wellhead device or the wellhead infrastructure.

The fastening arrangement may comprise a locking member such as a locking ring or the like. The locking member may define a screw thread for coupling with a complementary screw thread of the wellhead device or the wellhead infrastructure.

The fastening arrangement may comprise one or more fasteners. The one or more fasteners may extend from the cap member to the wellhead device or the wellhead infrastructure.

The cap member may comprise a flange for attaching to a further flange of the wellhead device or wellhead infrastructure. For example the cap member may comprise a flange for attaching to a further flange of a lateral or side port of the wellhead device or wellhead infrastructure.

The opening of the wellhead device or the wellhead infrastructure may comprise an opening of a through-bore of the wellhead device or the wellhead infrastructure. Such a cap arrangement may permit transmission and/or reception of electromagnetic signals to/from a tubular located arranged around a periphery of the borehole or a tubular located centrally within the borehole.

The opening of the wellhead device or the wellhead infrastructure may comprise a side port of a wellhead device or the wellhead infrastructure. Such a cap arrangement may permit transmission and/or reception of electromagnetic signals to/from an annulus.

The cap arrangement may comprise a seal member configured to form a seal between the cap member and the opening of the wellhead device or wellhead infrastructure.

The cap arrangement may be configured such that attachment of the cap member to the wellhead device or the wellhead infrastructure energises the seal member between the cap member and the opening of the wellhead device or wellhead infrastructure.

The antenna may be configured to extend from the opening of the wellhead device or wellhead infrastructure along an internal path of the wellhead device or wellhead infrastructure when the cap member is fitted within the opening of the wellhead device or wellhead infrastructure.

The cap arrangement may comprise an electrical conductor extending from the antenna through the cap member.

The electrical conductor and the cap member may be sealed relative to one another.

The cap arrangement may comprise separate transmitter and receiver antennas.

The cap arrangement may comprise at least one removable insert. The at least one removable insert may be attachable to, or installable or fixable into, the cap member. The at least one removable insert may have a threaded connection to the cap member.

The antenna may be provided with, attached to, mounted on, suspended from, accommodated within, at least partially defined by, and/or integrally formed with, the removable insert. The removable insert may comprise an antenna assembly.

The at least one antenna may be a linear, strip, spiral, patch, slot, cone or horn antenna, or the like. The antenna may be attached to the underside of the cap arrangement. The antenna may be suspended within or from the cap arrangement. The antenna may be at least partially defined by the cap arrangement. The antenna may be partially or wholly integrally formed within the cap arrangement. The antenna may be suspended within or from the at least one removable insert. The antenna may be at least partially defined by the at least one removable insert. The antenna may be partially or wholly integrally formed within the at least one removable insert. The antenna may be suspended within or from the cap member. The antenna may be at least partially defined by the cap member. The antenna may be partially or wholly integrally formed within the cap member.

The at least one antenna may be configured to transmit an electromagnetic signal to, and/or receive an electromagnetic signal from, the annulus of the wellbore.

The at least one antenna may be configured to transmit an electromagnetic signal to, and/or receive an electromagnetic signal from, a tubing string inside the wellbore.

The cap arrangement may comprise at least one electrical conductor extending from the at least one antenna through the cap member and/or the at least one removable insert. The at least one electrical conductor and the cap member or the at least one removable insert may be sealed relative to one another. The cap arrangement may comprise at least one pack off through which the at least one electrical conductor passes. The at least one pack off may be comprised in or attachable to the cap member or the at least one removable insert.

The cap arrangement may be configured such that the individual components of the cap arrangement cannot fall into the wellhead device or wellhead infrastructure. For example, the largest external diameter of the removable insert may be larger than the smallest internal diameter of the feature of the cap member to which the removable insert is attachable. The removable insert may comprise a frusto-conical part or frusto-conical thread, for example a tapered thread. The removable insert may comprise a shoulder which will abut the cap member. Similarly, the parts of the removable insert or antenna assembly may be shaped such that they cannot fall into the wellhead device or wellhead infrastructure. For example, the removable insert may comprise a shoulder which prevents the removable insert from passing through the cap member, may comprise a pack off with a tapered thread, and/or may comprise an integrally formed horn antenna. In this way no components of the removable insert or antenna assembly can fall into the well.

The cap arrangement may comprise a window for electromagnetic signals. The window may be permeable to electromagnetic signals. The window may be impermeable to fluids, including gases. The window may be or comprise a dielectric material. The window may be configured to be between the at least one antenna and a bore of the wellhead device or wellhead infrastructure. The window may be configured to withstand wellbore pressures and maintain a pressure difference across the window. The window may be configured to allow pressures to equalise across the window.

The cap arrangement may comprise one or more insert seals which are configured to provide a seal between the at least one removable insert and the cap member. The at least one insert seal may be an O-ring. The at least one insert seal may be or comprise a thread, for example a tapered thread.

The cap arrangement may comprise two or more insert seals between the same removable insert and the cap member, and a space may be defined between each pair of insert seals. The cap arrangement may comprise two or more insert seals which are substantially concentric and axially spaced, for example spaced along the wellbore axis.

The cap arrangement may at least partially define or provide at least one pressure test port. The cap arrangement may comprise at least one valve which operates to seal or open the at least one pressure test port. The at least one valve may be a bleed valve. The cap arrangement may comprise at least one pressure gauge configured to work with the at least one pressure test port.

The at least one pressure test port may be wholly or partially defined or provided by the removable insert. The at least one pressure test port may be wholly or partially defined or provided by the cap member. The at least one pressure test port may be wholly or partially defined or provided by the cooperation of the cap member and wellhead device or wellhead infrastructure.

The at least one pressure test port may be configured for fluid flow communication with a bore of the wellhead device or wellhead infrastructure. The at least one pressure test port may be configured for fluid flow communication with the space between two insert seals, such that applying pressure through the port will pressurise the space between the two insert seals and consequently apply pressure to both seals. The at least one pressure test port may be configured for fluid flow communication with a tubular located or arranged around a periphery of the borehole or a tubular located centrally within the borehole. The at least one pressure test port may be configured for fluid flow communication with an annulus.

The cap arrangement may be configured such that applying pressure to the at least one pressure test port will pressurise a bore, tubular or annulus of the wellhead device or wellhead infrastructure. The cap arrangement may be configured such that applying pressure to the at least one pressure test port will pressurise the space between two insert seals.

The cap arrangement may comprise a tubing hanger.

The cap member may comprise a tubing hanger.

The at least one antenna may be suspended from, attached to, recessed into, or integrally formed in the underside of the tubing hanger. For example, an antenna may be recessed into the tubing hanger and configured such that it sends and/or receives signals to and/or from the annulus of the well.

The cap arrangement may comprise at least one electrical conductor extending from the at least one antenna through the tubing hanger. The at least one electrical conductor and the tubing hanger may be sealed relative to one another. The at least one removable insert may be installable or fixable into the tubing hanger. The cap arrangement may comprise at least one seal between the at least one removable insert and the tubing hanger.

For example, the tubing hanger may define a feature into which a removable insert comprising an antenna, electrical conductor and pack off may be installed. A tapered thread may provide a seal between the removable insert and the tubing hanger. The antenna may then be able to receive and/or transmit down the annulus of the wellbore.

The cap arrangement may comprise a window which is transparent to an electromagnetic signal transmitted from and/or received by the antenna and which separates the antenna from a wellbore or a well annulus.

The cap member may comprise the window.

The window may comprise a dielectric material.

The window may be configured to seal the antenna from well pressure.

The window may be situated on the underside of the cap member.

The window may be situated on the underside of the tubing hanger.

According to a fourth aspect of the present invention there is provided a method of fitting a cap arrangement for a wellhead device or wellhead infrastructure, the cap arrangement comprising an antenna and the method comprising inserting the antenna into an internal path of the wellhead device or wellhead infrastructure.

The wellhead device or wellhead infrastructure may comprise a Christmas tree.

The method may comprise closing a valve of the wellhead device or wellhead infrastructure so as to isolate the internal path of the wellhead device or wellhead infrastructure from well pressure before inserting the antenna into the internal path.

The method may comprise fitting the cap member into the opening of the wellhead device or wellhead infrastructure after inserting the antenna into the internal path so as to seal the opening of the wellhead device or wellhead infrastructure.

The method may comprise opening the valve so as to re-expose the internal path of the wellhead device or wellhead infrastructure to well pressure.

The wellhead device or wellhead infrastructure may comprise an industry-standard wellhead device or wellhead infrastructure such as an industry-standard Christmas tree. The method may allow a cap arrangement to be retrofitted to the wellhead device or wellhead infrastructure. According to a fifth aspect of the present invention there is provided a cap arrangement for a wellhead device or wellhead infrastructure, wherein the cap arrangement at least partially defines or provides at least one pressure test port.

The wellhead device or wellhead infrastructure may comprise a Christmas tree.

The cap arrangement may be configured for sealing an opening of a wellhead device or an opening of wellhead infrastructure.

The cap arrangement may comprise a cap member.

The cap member may be configured to engage, to fit within, and/or to fit onto an opening of the wellhead device or wellhead infrastructure.

The cap member may be configured to engage and/or to fit within a bore such as the main bore of the wellhead device or wellhead infrastructure.

The cap member may be configured to engage and/or to fit within a flow path, port or conduit, such as a lateral or side flow path, a lateral or side port, or a lateral or side conduit of the wellhead device or wellhead infrastructure.

The cap member may be attachable to the wellhead device or wellhead infrastructure. This may allow the cap member to be retro-fitted to a wellhead device or wellhead infrastructure.

The cap arrangement may comprise a fastening arrangement for attaching the cap member to the wellhead device or the wellhead infrastructure.

The fastening arrangement may comprise a locking member such as a locking ring or the like. The locking member may define a screw thread for coupling with a complementary screw thread of the wellhead device or the wellhead infrastructure.

The fastening arrangement may comprise one or more fasteners. The one or more fasteners may extend from the cap member to the wellhead device or the wellhead infrastructure.

The cap member may comprise a flange for attaching to a further flange of the wellhead device or wellhead infrastructure. For example the cap member may comprise a flange for attaching to a further flange of a lateral or side port of the wellhead device or wellhead infrastructure.

The cap arrangement may be configured for attachment to a wellhead device or wellhead infrastructure, for example during a retrofit or work-over of that wellhead device or wellhead infrastructure. The wellhead device or wellhead infrastructure may comprise an industry-standard wellhead device or wellhead infrastructure such as an industry-standard Christmas tree.

The cap arrangement may comprise a seal member configured to form a seal between the cap member and the opening of the wellhead device or wellhead infrastructure.

The cap arrangement may be configured such that attachment of the cap member to the wellhead device or the wellhead infrastructure energises the seal member between the cap member and the opening of the wellhead device or wellhead infrastructure.

The at least one pressure test port may be configured for fluid flow communication with a bore of the wellhead device or wellhead infrastructure. The at least one pressure test port may allow for pressure testing of the wellhead device or wellhead infrastructure. The at least one pressure test port may allow for pressure testing of the cap arrangement. The at least one pressure test port may be configured for fluid flow communication with a tubular located or arranged around a periphery of the borehole or a tubular located centrally within the borehole. The at least one pressure test port may be configured for fluid flow communication with an annulus.

The cap arrangement may be configured such that applying pressure to the at least one pressure test port may pressurise a bore of the wellhead device or wellhead infrastructure.

The cap arrangement may comprise at least one valve which acts to seal or open the at least one pressure test port. The valve may be a bleed valve. The cap arrangement may comprise at least one pressure gauge configured to work with the at least one pressure test port.

The cap arrangement may comprise at least one removable insert. The at least one removable insert may be attachable to, or installable or fixable into, the cap member. The at least one removable insert may have a threaded connection to the cap member.

The at least one pressure test port may be wholly or partially defined or provided by the cap member. The at least one pressure test port may be wholly or partially defined or provided by the removable insert. The at least one pressure test port may be wholly or partially defined or provided by the interaction between the cap member and wellhead device or wellhead infrastructure.

The cap arrangement may comprise one or more insert seals which are configured to provide a seal between the at least one removable insert and the cap member. The at least one insert seal may be an O-ring. The at least one insert seal may be or comprise a thread, for example a tapered thread.

The cap arrangement may comprise two or more insert seals between the same removable insert and the cap member, and a space may be defined between each pair of insert seals. The cap arrangement may comprise two or more insert seals which are substantially concentric and axially spaced, for example spaced along the wellbore axis.

The at least one pressure test port may be configured for fluid flow communication with a bore of the wellhead device or wellhead infrastructure. The at least one pressure test port may be configured for fluid flow communication with the space between two insert seals, such that applying pressure through the port will pressurise the space between the two insert seals and consequently apply pressure to both seals.

The cap arrangement may be configured such that applying pressure to the at least one pressure test port will pressurise a bore, tubular or annulus of the wellhead device or wellhead infrastructure. The cap arrangement may be configured such that applying pressure to the at least one pressure test port will pressurise the space between two insert seals.

The cap arrangement may therefore provide a way to pressure test the integrity of the seal around a removable insert, without the need to pressurise any spaces other than the space between two insert seals and the pressure test port.

The cap arrangement may be configured such that the individual components of the cap arrangement cannot fall into the wellhead device or wellhead infrastructure. For example, the largest external diameter of the removable insert may be larger than the smallest internal diameter of the feature of the cap member to which the removable insert is attachable. The removable insert may comprise a frusto-conical part or frusto-conical thread, for example a tapered thread. The removable insert may comprise a shoulder which will abut the cap member. Similarly, the parts of the removable insert may be shaped such that they cannot fall into the wellhead device or wellhead infrastructure. For example, the removable insert may comprise a shoulder which prevents the removable insert from passing through the cap member, may comprise a pack off with a tapered thread, and/or may comprise an integrally formed horn antenna. In this way no components of the removable insert can fall into the well.

The cap arrangement may comprise or at least partially define an antenna.

The antenna may be provided with, attached to, mounted on, suspended from, accommodated within, at least partially defined by, and/or integrally formed with, the cap member.

The antenna may be configured to extend from the opening of the wellhead device or wellhead infrastructure along an internal path of the cap arrangement or wellhead device or wellhead infrastructure when the cap member is fitted within the opening of the wellhead device or wellhead infrastructure.

The opening of the wellhead device or the wellhead infrastructure may comprise an opening of a through-bore of the wellhead device or the wellhead infrastructure. Such a cap arrangement may permit transmission and/or reception of electromagnetic signals to/from a tubular located arranged around a periphery of the borehole or a tubular located centrally within the borehole.

The opening of the wellhead device or the wellhead infrastructure may comprise a side port of a wellhead device or the wellhead infrastructure. Such a cap arrangement may permit transmission and/or reception of electromagnetic signals to/from an annulus.

The cap arrangement may comprise an electrical conductor extending from the antenna through the cap member. The electrical conductor and the cap member may be sealed relative to one another.

The antenna may be provided with, attached to, mounted on, suspended from, accommodated within, at least partially defined by, and/or integrally formed with, the removable insert. The at least one removable insert may be an antenna assembly.

The at least one antenna may be a linear, strip, spiral, patch, slot, cone or horn antenna, or the like. The antenna may be attached or attachable to the underside of the cap arrangement. The antenna may be suspended within or from the cap arrangement. The antenna may be at least partially defined by the cap arrangement. The antenna may be partially or wholly formed within the cap arrangement. The at least one antenna may be suspended within or from the at least one removable insert. The antenna may be at least partially defined by the at least one removable insert. The antenna may be partially or wholly integrally formed within the at least one removable insert. The antenna may be suspended within or from the cap member. The antenna may be at least partially defined by the cap member. The antenna may be partially or wholly integrally formed within the cap member.

The at least one antenna may be configured to transmit an electromagnetic signal to, and/or receive an electromagnetic signal from, the annulus of the wellbore.

The at least one antenna may be configured to transmit an electromagnetic signal to, and/or receive an electromagnetic signal, from a tubing string inside the wellbore.

The cap arrangement may comprise a tubing hanger.

The cap member may comprise a tubing hanger.

The at least one antenna may be suspended from, attached to, recessed into, or integrally formed in the underside of the tubing hanger. For example, an antenna may be recessed into the tubing hanger and configured such that it sends and/or receives signals to and/or from the annulus of the well.

The cap arrangement may comprise at least one electrical conductor extending from the at least one antenna through the tubing hanger. The at least one electrical conductor and the tubing hanger may be sealed relative to one another. The at least one removable insert may be installable or fixable into the tubing hanger. The cap arrangement may comprise at least one seal between the at least one removable insert and the tubing hanger.

For example, the tubing hanger may define a feature into which a removable insert comprising an antenna, electrical conductor and pack off may be installed. A tapered thread may provide a seal between the removable insert and the tubing hanger. The antenna may then be able to receive and/or transmit down the annulus of the wellbore.

The cap arrangement may comprise a window which is transparent to an electromagnetic signal transmitted from and/or received by the antenna and which separates the antenna from a wellbore or a well annulus.

The cap member may comprise the window.

The window may comprise a dielectric material.

The window may be configured to seal the antenna from well pressure.

The window may be situated on the underside of the cap member.

The window may be situated on the underside of the tubing hanger.

The cap arrangement may comprise one or more of the features of the cap arrangement according to the third aspect of the present invention.

According to a sixth aspect of the present invention there is provided a system for pressure testing a wellhead device or wellhead infrastructure, wherein the system comprises a cap arrangement providing or at least partially defining at least one pressure test port.

According to a seventh aspect of the present invention there is provided a method for pressure testing a cap arrangement comprising:

applying pressure through a pressure test port provided or at least partially defined by the cap arrangement.

The method may comprise attaching the cap arrangement to a wellhead device or wellhead infrastructure or installing the cap arrangement onto a wellhead device or wellhead infrastructure.

The method may comprise using the cap arrangement to seal an opening of the wellhead device or wellhead infrastructure.

Pressure may be applied through the cap pressure test port prior to installation of the cap arrangement onto the well. Pressure may be applied through the cap pressure test port after the installation of the cap arrangement onto the well.

The method may comprise pressure testing the cap arrangement ex-situ prior to installation of the cap arrangement onto the well, and then pressure testing the cap arrangement again in-situ after the installation of the cap arrangement onto the well.

The method may comprise installing the cap arrangement into a test rig. The method may comprise pressure testing the cap arrangement within the test rig. The cap arrangement may be pressure tested within the test rig using the at least one pressure test port provided by the cap arrangement or using a pressure test port defined within the test rig.

The method may comprise pressure testing the cap arrangement after installation onto the well using a pressure test port external to the cap arrangement.

For example, the cap arrangement may be pressure tested in a test rig, using a pressure test port defined within that test rig, prior to installation of the cap arrangement onto the well. The cap arrangement may then be installed onto a well and pressure tested using a cap pressure test port defined by the cap arrangement.

The method may comprise closing a valve on the well, for example on the wellhead device or wellhead infrastructure. This may allow the cap arrangement to be pressure tested without the need to pressurise below the valve.

The cap arrangement may comprise a cap member. The cap arrangement may comprise an antenna. The cap arrangement may comprise at least one removable insert. The removable insert may be installable or attachable into the cap member. The at least one removable insert may be an antenna assembly.

The cap arrangement may comprise one or more of the features of the cap arrangement according to the third or fifth aspects of the invention.

The at least one pressure test port may be wholly or partially defined or provided by the removable insert. The at least one pressure test port may be wholly or partially defined or provided by the cap member.

The method may comprise attaching the at least one removable insert to the cap member. The method may comprise installing the at least one removable insert into the cap member.

For example, the method may comprise installing a removable insert into a cap member, and then installing the resulting cap arrangement onto a well. The cap arrangement may then be pressure tested using a pressure test port defined at least partially by the removable insert or cap member. Additionally, the method may comprise removing the removable insert and replacing it with another, then pressure testing again using the cap pressure test port.

In another example, a removable insert may be installed into a cap member and pressure tested using a pressure test port prior to installation onto a well.

The cap arrangement may comprise at least one insert seal between the at least one removable insert and the cap member. The cap arrangement may comprise two or more insert seals between the same removable insert and the cap member. The at least one insert seal may be an O-ring. The at least one insert seal may be or comprise a thread, for example a tapered thread.

The method may comprise pressurising the space between two insert seals, such that pressure is applied to both insert seals. Therefore, the method may allow for the pressure integrity of a removable insert to be verified without the need to pressurise anything more than the space between two insert seals and the pressure test port.

For example, the method may comprise installing a removable insert into a cap member and pressure testing the cap member by applying pressure to a pressure test port, without the need to pressurise any space external to the cap arrangement and testing apparatus. The pressure test could occur before or after the installation of the cap arrangement onto a well.

According to an eighth aspect of the present invention there is provided a method for pressure testing a wellhead device or wellhead infrastructure comprising:

applying pressure through a pressure test port at least partially defined or provided by a cap arrangement used to seal an opening of the wellhead device or wellhead infrastructure.

The wellhead device or wellhead infrastructure may comprise a Christmas tree.

The cap arrangement may be configured for attachment to a wellhead device or wellhead infrastructure, for example during a retrofit or work-over of that wellhead device or wellhead infrastructure. The wellhead device or wellhead infrastructure may comprise an industry-standard wellhead device or wellhead infrastructure such as an industry-standard Christmas tree.

The method may comprise one or more of the steps of the method according to the seventh aspect of the present invention.

For example, the method may comprise the steps of closing a valve on the wellhead device or wellhead infrastructure and then applying pressure through the pressure test port in order to pressurise the space between the valve and the pressure test port and thereby test the integrity of the wellhead device or wellhead infrastructure, including the cap arrangement.

BRIEF DESCRIPTION OF DRAWINGS

The present invention will now be described by way of non-limiting example only with reference to the following figures of which.

DETAILED DESCRIPTION OF DRAWINGS

Figure 1:
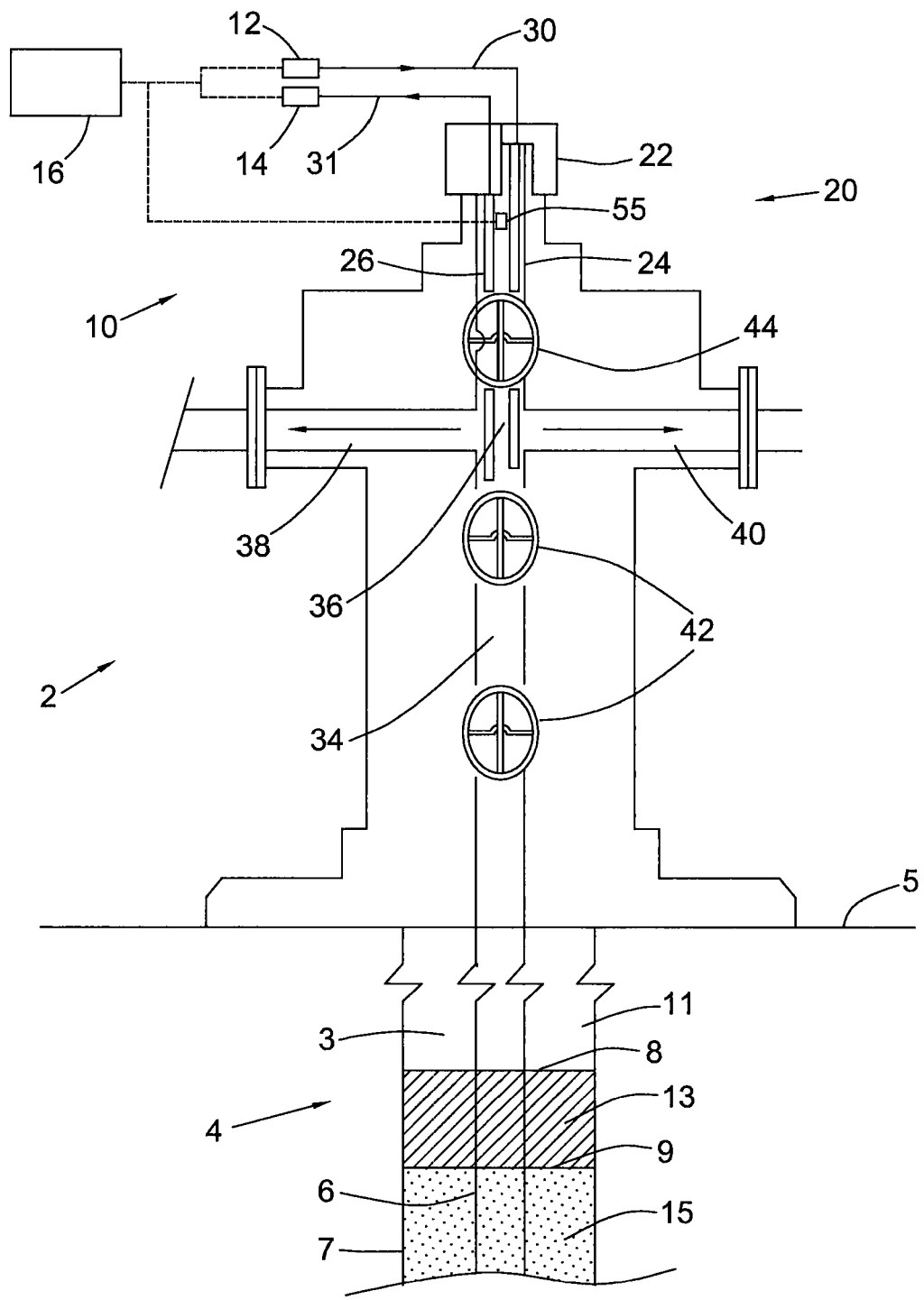
FIG. 1 is a schematic of a Christmas tree at a head of an oil, gas or water well including a first system for detecting a downhole feature in the oil, gas and/or water well.

Referring initially to FIG. 1, there is shown a Christmas tree generally designated 2 located at the head of an oil, gas and/or water well which is generally designated 4 and which extends downwardly from surface 5. The Christmas tree 2 may be a subsea tree or a surface tree and, as such, surface 5 may represent the seabed or ground level respectively. The well 4 includes production tubing 6 centrally located within a casing 7. An annulus 3 is defined between the production tubing 6 and the casing 7. A first feature in the form of a first fluid interface 8 is located downhole in the well 4 between a first fluid 11 and a second fluid 13. A second feature in the form of a second fluid interface 9 is located downhole in the well 4 between the second fluid 13 and a third fluid 15. As shown in FIG. 1, the second fluid interface 9 is located downhole in the well 4 below the first fluid interface 8. The first fluid 11 may be a gas such a hydrocarbon gas or a mixture of gases. The first fluid 11 may be air. The second fluid 13 may be oil. The third fluid 15 may be water. The first fluid interface 8 may be a gas-oil interface. The second fluid interface 9 may be an oil-water interface.

The Christmas tree 2 includes a system generally designated 10 for detecting a downhole feature located downhole in the well 4, such as the first and second fluid interfaces 8, 9. The system 10 comprises a transmitter 12, a receiver 14 and a controller 16. As indicated by the dotted lines in FIG. 1, the controller 16 is configured for communication with the transmitter 12 and the receiver 14. The system 10 comprises a cap arrangement which is generally designated 20 and which includes a cap member 22, and transmitter and receiver antennas 24 and 26 respectively extending downwardly from the cap member 22. The system 10 further comprises a first electrical conductor 30 which extends through the cap portion 22 and connects the transmitter 12 to the transmitter antenna 24, and a second electrical conductor 31 which extends through the cap member 22 and connects the receiver antenna 26 to the receiver 14.

Figure 2:
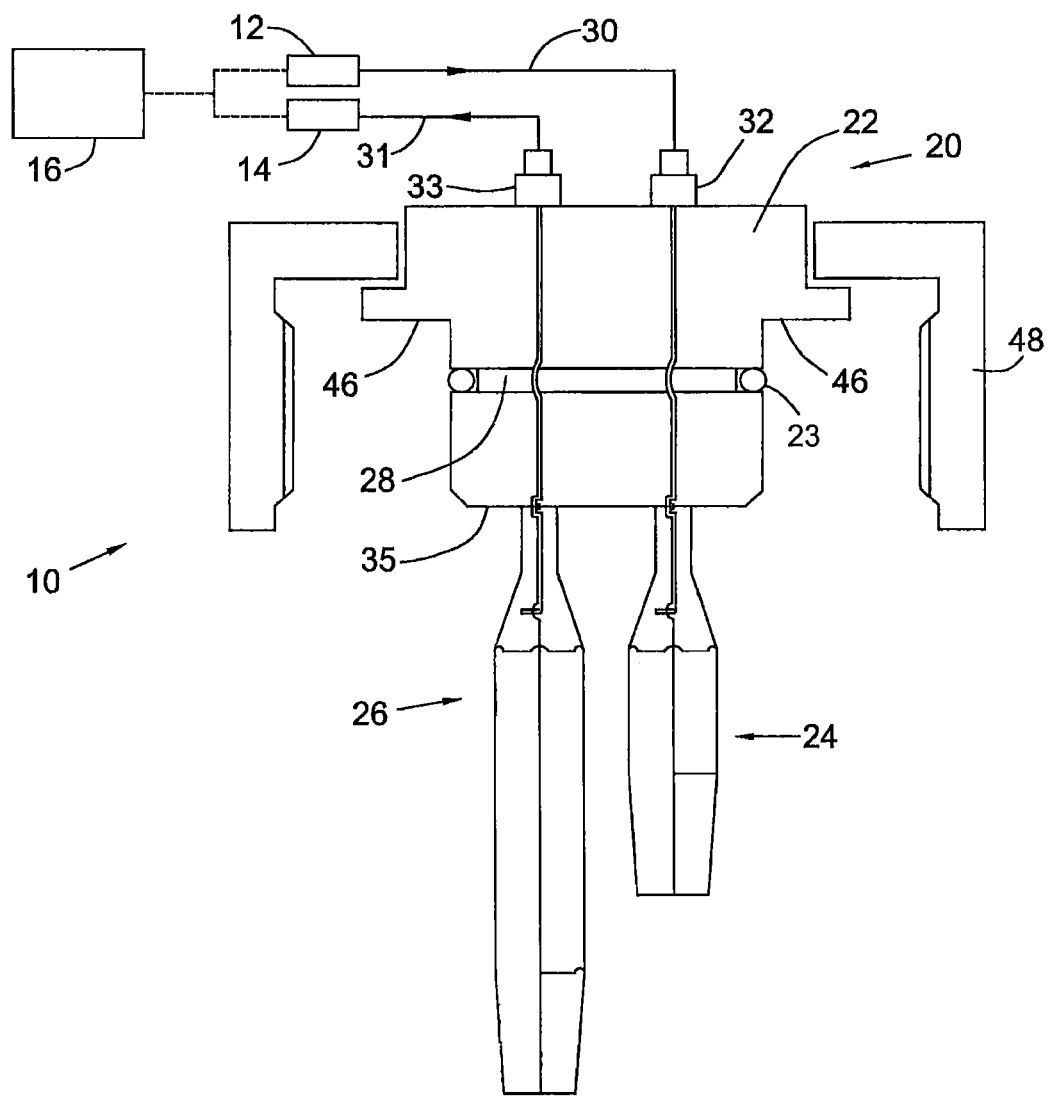
FIG. 2 shows the system of FIG. 1 in isolation from the Christmas tree.

The system 10 is shown in more detail in FIG. 2. The first and second electrical conductors 30, 31 are sealed relative to the cap member 22 via cable glands 32, 33. The cap member 22 defines an annular groove 28 in an outer diameter thereof. The cap member 22 further includes an O-Ring 23 which is accommodated in the annular groove 28.

The transmitter and receiver antennas 24, 26 are modified horn antennas which extend downwardly from a lower surface 35 of the cap member 22 into a through bore 34 of the Christmas tree 2. As shown most clearly in FIG. 2, the receiver antenna 26, extends downwardly into the through bore 34 further than the transmitter antenna 24. This may serve to ensure that a return electromagnetic signal propagating upwardly through the through bore 34 encounters and is received by the receiver antenna 26 before the return electromagnetic signal is incident upon the transmitter antenna 24. This may serve to reduce or suppress noise on the received signal caused by any distortion or spurious reflections of the return electromagnetic signal that may otherwise occur from the transmitter antenna 24.

With reference to FIG. 1, once the cap arrangement 20 is fitted to the Christmas tree 2, each of the transmitter and receiver antennas 24, 26 extend downwardly past a junction 36 between the through bore 34 and flow and kill paths 38 and 40 respectfully which extend laterally from the through bore 34.

To fit the cap arrangement 20 to the Christmas tree 2, one or both of the valves 42 are first closed so as to isolate a portion of the through bore 34 above the valves 42 from well pressure. Subsequently, the valve 44 is opened and the transmitter and receiver antennas 24, 26 are inserted into the through bore 34 of the Christmas tree 2 past the valve 44 to a depth below the flow and kill paths 38, 40 until the O-ring 30 engages the through bore 34 and forms a seal therewith and a shoulder or flange 46 of the cap member 22 shown in FIG. 2 engages an upper surface (not shown) of the Christmas tree 2. A locking member 48 shown in FIG. 2 is screw coupled to the Christmas tree 2 to lock the cap member 22 in place relative to the Christmas tree 2.

In use, the transmitter 12 transmits a radio frequency electrical signal to the transmitter antenna 24. The frequency of the electrical signal is varied sequentially in the range 4 to 40 GHz. Typically, the transmitter 12 sequentially transmits 10,000 or more different radio frequencies in the range 4 to 40 GHz to the transmitter antenna 24. The transmitter antenna 24 couples the transmitted electrical signal to a guided TE-01 mode in the through bore 34. The TE-01 mode propagates through a space defined within the production tubing 6 to the first and second fluid interfaces 8, 9. At least a portion of the electromagnetic signal incident upon the first and second fluid interfaces 8, 9 is reflected from the first and second fluid interfaces 8, 9 and propagates as a guided TE-01 mode back up through the space defined within the production tubing 7 and the through bore 34 to the receiver antenna 26. The receiver antenna 26 couples the return electromagnetic signal to a return electrical signal which propagates along the second electrical conductor 31 to the receiver 14.

Figure 3:
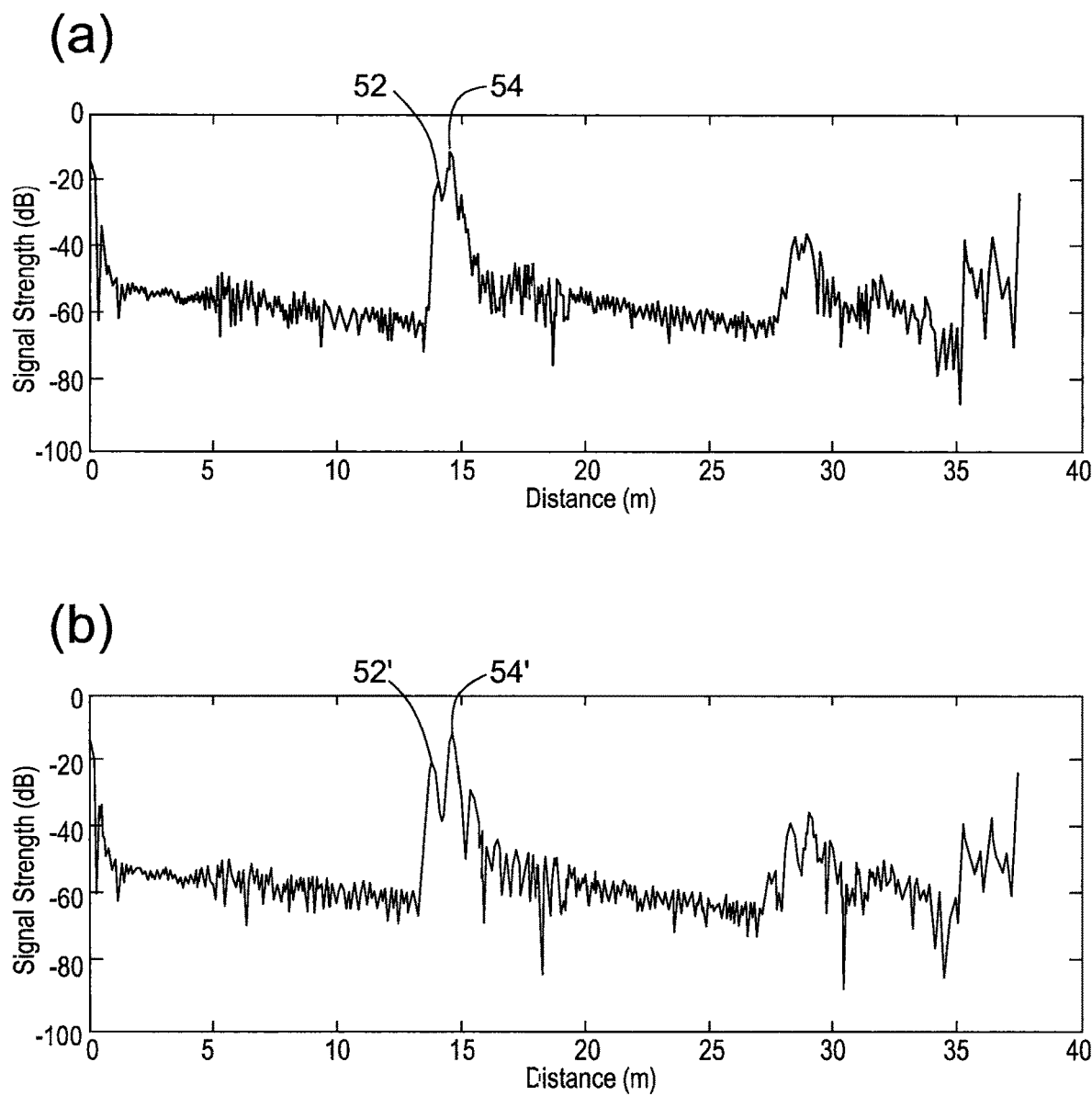
FIG. 3(a) shows a plot of reflectance as a function of distance measured using the system of FIG. 1 in a 5" (0.127 m) outer diameter tubular containing water and a 0.3 m thick layer of oil above the water.
FIG. 3(b) shows a plot of reflectance as a function of distance measured using the system of FIG. 1 in a 5" (0.127 m) outer diameter tubular containing water and a 0.5 m thick layer of oil above the water.

The controller 16 determines the magnitudes and phases of both the transmitted and received electrical signals as a function of frequency and determines a magnitude frequency spectrum and a phase frequency spectrum from the measured magnitudes and phases of both the transmitted and received electrical signals. The controller 16 uses an inverse Fourier transform to determine a reflectance time domain trace from the magnitude frequency spectrum and the phase frequency spectrum. From knowledge of the permittivities of any fluids present in the production tubing 6 at the appropriate frequencies, the controller 16 determines a reflectance trace as a function of depth. A plot of reflectance as a function of distance thus obtained for the case of 5" (0.127 m) outer diameter production tubing 7 containing water and a 0.3 m thick layer of oil above the water is shown in FIG. 3(a). The reflectance plot includes a first reflectance peak 52 which corresponds to reflection from a gas-oil interface 8 at a distance from the transmitter of approximately 14 m and a second reflectance peak 54 which corresponds to reflection from an oil-water interface 9 at a distance of approximately 14.3 m. The reflectance plot as a function of distance obtained for the same 5" (0.127 m) outer diameter production tubing 7 after the addition of oil to provide a 0.5 m thick layer of oil above the water is shown in FIG. 3(b). In FIG. 3(b) it is clear that the separation of the reflectance peaks 52' and 54' after the addition of the oil is greater than the separation of the reflectance peaks 52 and 54 of FIG. 3(a) before the addition of the oil and corresponds to a separation of approximately 0.5 m. Thus, it is clear that the system 10 is capable of resolving reflectance features from fluid interfaces separated by distances of 0.5 m or less.

The system 10 may be used to monitor downhole pressure in the well 4. The system 10 comprises a pressure sensor 55 located within the through bore 34 for measuring pressure within the through bore 34. The pressure sensor 55 is configured for communication with the controller 16. Having determined the distance between the surface 5 and the gas-oil interface 8 and the distance between the surface 5 and the oil-water interface 9, the controller 16 may use the pressure sensed by the pressure sensor 55 together with a known specific gravity of the gas 11 and the oil 13 to determine a pressure at the oil-water interface 9. Such a method may be useful for controlling production from the well 4 and/or injection into the well 4. Such a method may provide a wireless, non-invasive solution for measuring downhole pressure in the well 4.

Figure 4:
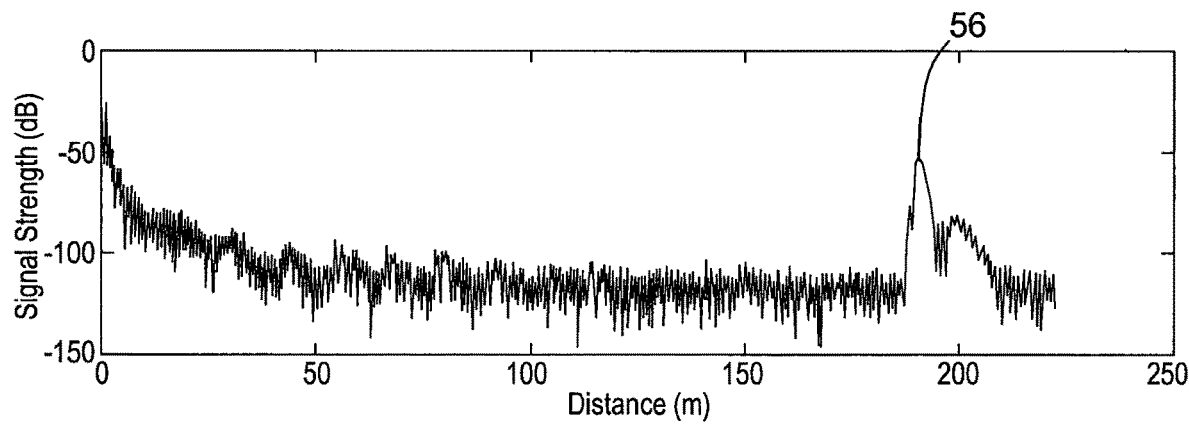
FIG. 4(a) shows a plot of reflectance as a function of distance measured using the system of FIG. 1 in an 18" (0.457 m) outer diameter casing containing water prior to adding more water.
FIG. 4(b) shows a plot of reflectance as a function of distance measured using the system of FIG. 1 in an 18" (0.457 m) outer diameter casing containing water after adding more water.
Figure 4:
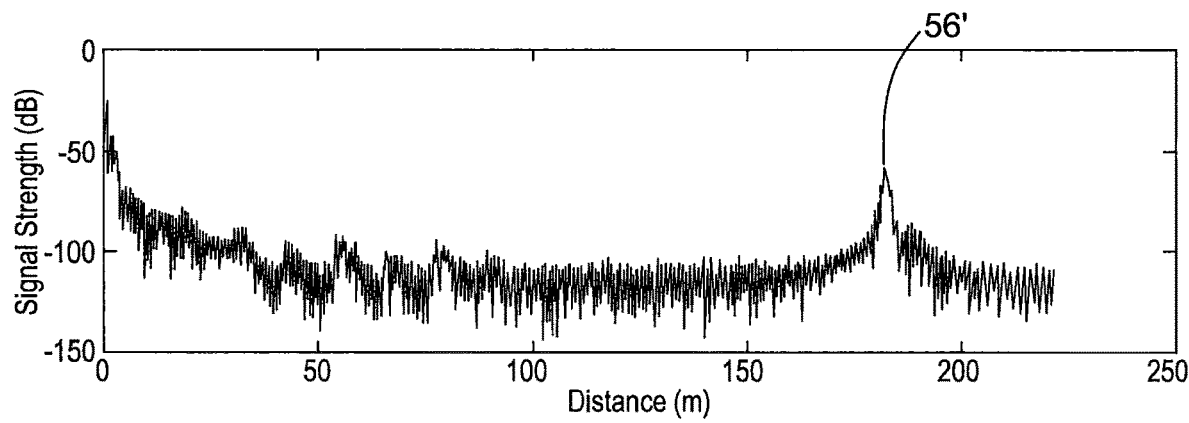

FIG. 4(a) shows a plot of reflectance as a function of distance measured using the system 10 in an 18" (0.457 m) outer diameter casing containing only water i.e. in the absence of the oil layer 13 shown in FIG. 1. The obvious reflectance peak 56 corresponds to reflection from a gas-water interface and is observed at a distance from the transmitter of 190.9 m. FIG. 4(b) shows a plot of reflectance as a function of distance measured using the system 10 in the same 18" (0.457 m) outer diameter casing after adding more water. The obvious reflectance peak 56' corresponds to reflection from the gas-water interface and is observed at a distance from the transmitter of 182.6 m. Thus, it is clear that the system 10 is capable of detecting fluid interfaces at depths down to approximately 180 m or more. One skilled in the art will, however, appreciate that, given the signal magnitudes shown in FIGS. 4(a) and 4(b) relative to the background noise floor, the system 10 is capable of detecting fluid interfaces at depths much greater than 180 m.

Figure 5:
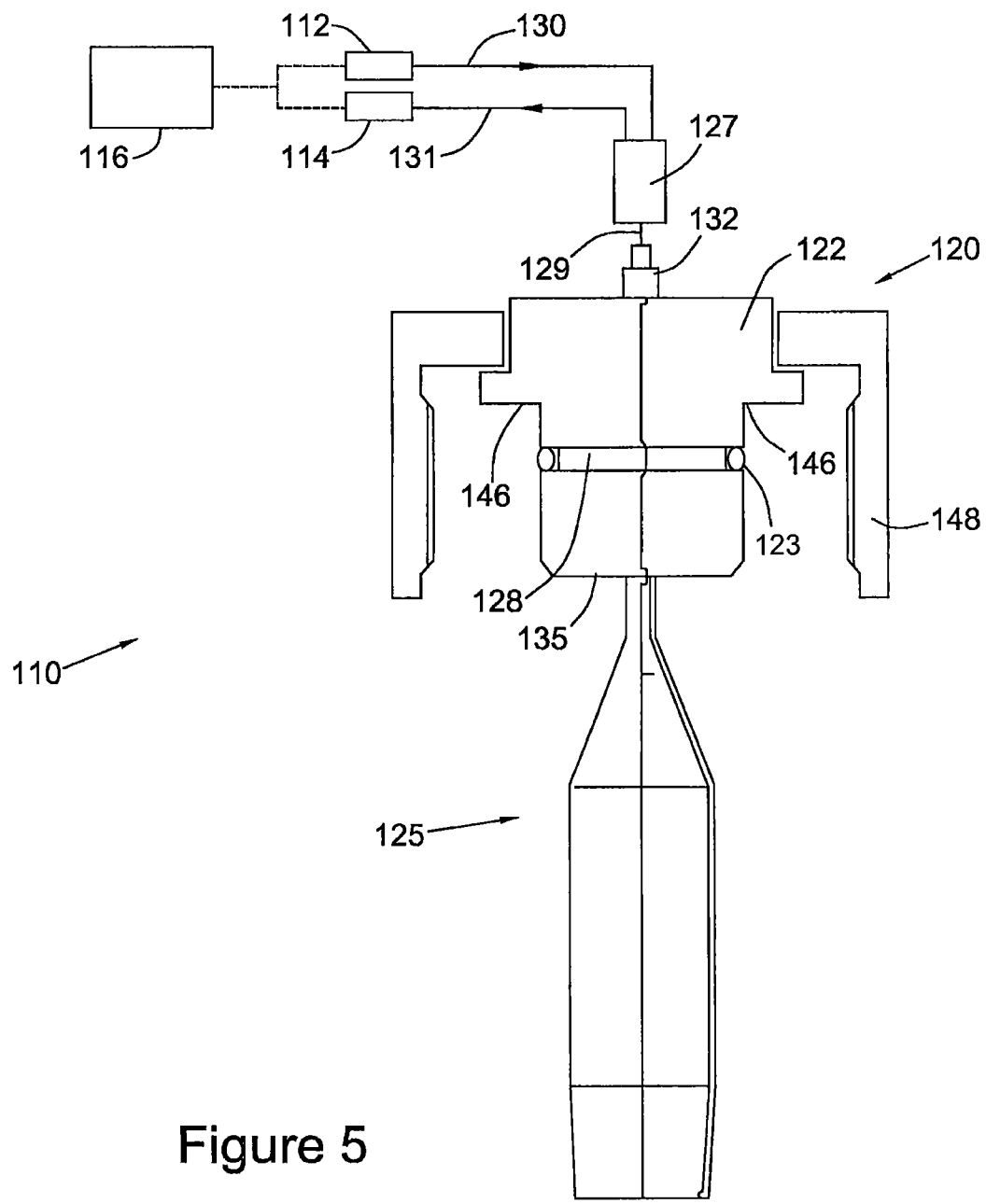
FIG. 5 shows a second system for detecting a downhole feature in isolation from a Christmas tree.

FIG. 5 shows a second system 110 for detecting a downhole feature in isolation from a Christmas tree. The second system 110 shares many like features with the system 10 of FIG. 2 and, as such, like reference numerals are used to identify like features. The system 110 comprises a transmitter 112, a receiver 114 and a controller 116. As indicated by the dotted lines in FIG. 5, the controller 116 is configured for communication with the transmitter 112 and the receiver 114.

The system 110 comprises a cap arrangement which is generally designated 120 and which includes a cap member 122. The cap member 122 defines an annular groove 128 in an outer diameter thereof. The cap member 122 further includes an O-Ring 123 which is accommodated in the annular groove 128. Unlike the system 10 of FIG. 2, the system 110 of FIG. 5 includes a single antenna 125 which extends downwardly from the cap member 122 and which is used for transmitting and receiving electromagnetic signals. Also provided are shoulder or flange 146 and locking member 148.

The system 110 further comprises a coupler device 127. The coupler device 127 is connected to the transmitter 112 by a first electrical conductor 130, to the receiver 114 by a second electrical conductor 131 and to the antenna 125 by a third electrical conductor 129. In use, electrical signals propagate along the third electrical conductor 129 in both directions between the coupler device 127 and the antenna 125. The third electrical conductor 129 extends through the cap member 122 and is sealed relative to the cap member 122 via a cable gland 132.

The antenna 125 is modified horn antenna which extends downwardly from a lower surface 135 of the cap member 122 and which is configured to extend centrally into a through bore of a Christmas tree (not shown in FIG. 5). The use of such an antenna 125 may provide improved coupling between electrical signals propagating along the third electrical conductor 129 and electromagnetic signals propagating along the through bore of the Christmas tree (not shown in FIG. 5).

Figure 6:
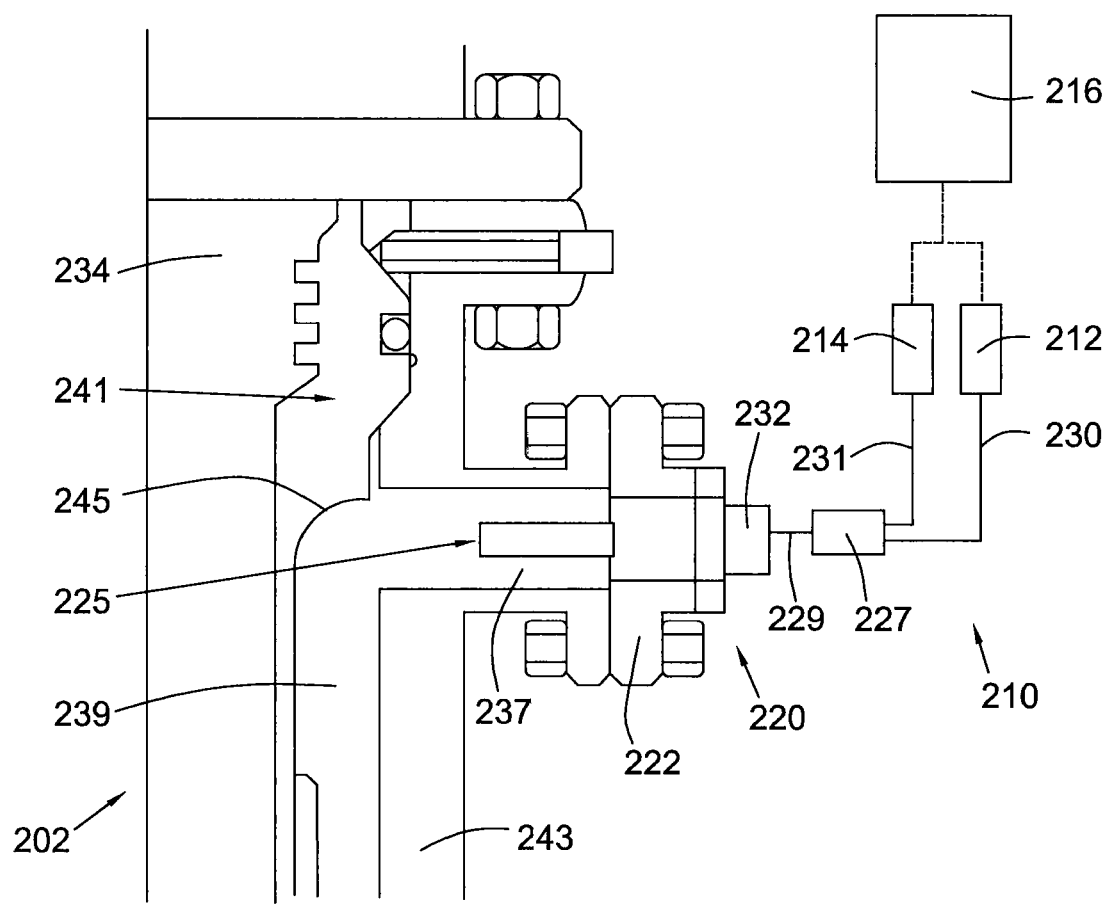
FIG. 6 shows a schematic cross-section of part of a Christmas tree at a wellhead of an oil, gas and/or water well including a third system for detecting a downhole feature in the oil, gas and/or water well.

FIG. 6 shows a schematic cross-section of part of a Christmas tree 202 including a third system 210 for detecting a downhole feature in an oil, gas and/or water well (not shown in FIG. 6). The third system 210 shares many like features with the system 110 of FIG. 5 and, as such, like reference numerals are used to identify like features. The system 210 comprises a transmitter 212, a receiver 214 and a controller 216. As indicated by the dotted lines in FIG. 6, the controller 216 is configured for communication with the transmitter 212 and the receiver 214. The system 210 includes a single antenna 225 for transmitting and receiving electromagnetic signals.

The system 210 comprises a cap arrangement which is generally designated 220 and which includes a cap member 222. Unlike the cap arrangement 120 of FIG. 5, the cap arrangement 220 is not configured to fit within a main through bore 234 of the Christmas tree 202 but is configured to fit within a lateral port or path 237 of the Christmas tree 202. The side port 237 provides access to an annulus 239 defined within the Christmas tree 202 between a tubing hanger 241 and an outer housing 243 of the Christmas tree 202. When the Christmas tree 202 is mounted at the head of an oil, gas and/or water well, such as the oil, gas and/or water well 4 shown in FIG. 1, the annulus 239 defined within the Christmas tree 202 is aligned with the annulus 3 of the well 4 so as to permit fluid flow communication therebetween.

The system 210 further comprises a coupler device 227. The coupler device 227 is connected to the transmitter 212 by a first electrical conductor 230, to the receiver 214 by a second electrical conductor 231 and to the antenna 225 by a third electrical conductor 229. In use, electrical signals propagate along the third electrical conductor 229 in both directions between the coupler device 227 and the antenna 225. The third electrical conductor 229 extends through the cap member 222 and is sealed relative to the cap member 222 via a cable gland 232.

Unlike the antenna 125 of the system 110 of FIG. 5, the antenna 225 extends laterally within the lateral path 237. In use, the antenna 125 transmits an electromagnetic signal in a lateral direction along the lateral path 237. The transmitted electromagnetic signal is deflected through 90 degrees by a curved portion 245 of an outer surface of the tubing hanger 241 so as to propagate downwardly through the annulus 239 defined within the Christmas tree 202 towards the annulus 3 of the oil and gas well 4 shown in FIG. 1. Similarly, a return electromagnetic signal propagating upwardly within the annulus 239 is first deflected by the curve portion 245 of the tubing hanger 241 before being received by the antenna 225.

Figure 7:
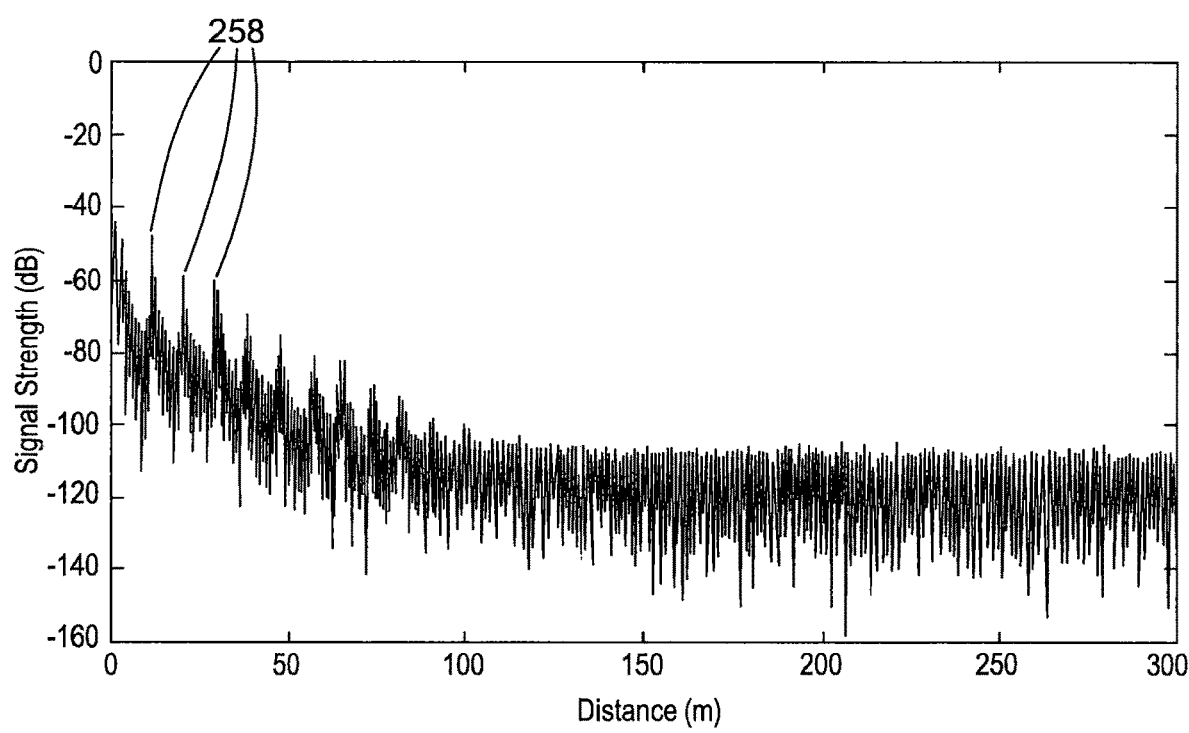
FIG. 7 shows a plot of reflectance as a function of distance measured using the system of FIG. 6 in an air-filled annulus defined between a 5" (0.127 m) outer diameter tubular and an 18" (0.457 m) outer diameter casing.

FIG. 7 shows a plot of reflectance as a function of distance measured using the system of FIG. 6 in an air-filled annulus defined between a 5" (0.127 m) outer diameter tubular and an 18" (0.457 m) outer diameter casing i.e. in the absence of the oil layer 13 and water 15 shown in FIG. 1. A plurality of reflectance peaks 258 are observed in FIG. 7. Each reflectance peak 258 corresponds to a coupling upset between adjacent lengths of casing 7. Thus, it is clear that the system to 210 of FIG. 6 may be used to measure distance and/or detect the presence of features in the annulus 3 other than fluid interfaces.

Figure 8:
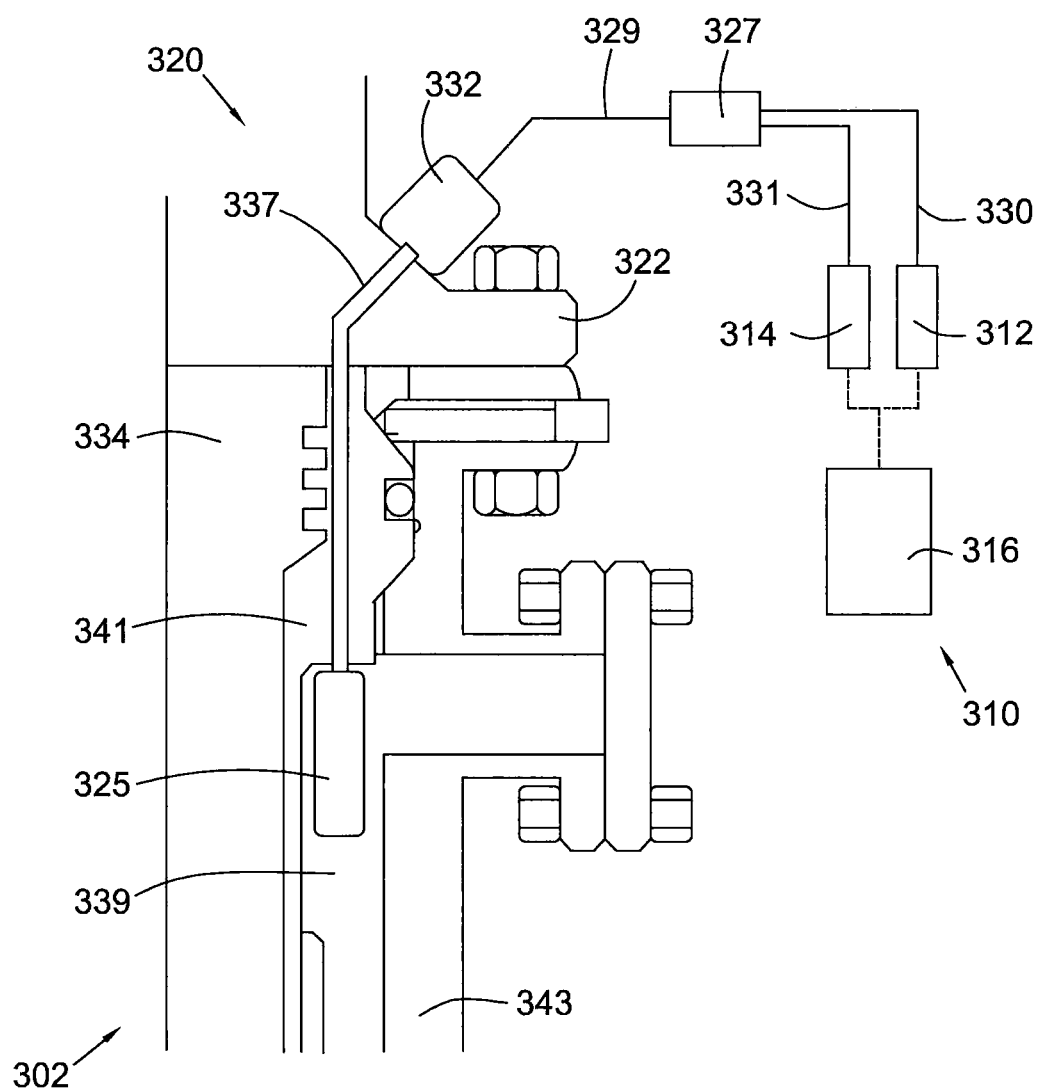
FIG. 8 shows a schematic cross-section of part of a Christmas tree at a wellhead of an oil, gas and/or water well including a fourth system for detecting a downhole feature in the oil, gas and/or water well.

FIG. 8 shows a schematic cross-section of part of a Christmas tree 302 including a fourth system 310 for detecting a downhole feature in an oil, gas and/or water well (not shown in FIG. 8). The fourth system 310 shares many like features with the system 210 of FIG. 6 and, as such, like reference numerals are used to identify like features. The system 310 comprises a transmitter 312, a receiver 314 and a controller 316. As indicated by the dotted lines in FIG. 8, the controller 316 is configured for communication with the transmitter 312 and the receiver 314.

The system 310 comprises a cap arrangement which is generally designated 320 and which includes a cap member 322. The system 310 includes a single antenna 325 for transmitting and receiving electromagnetic signals. Unlike the cap arrangement 220 of FIG. 6, the cap arrangement 320 is configured to fit within a feed-through port or path 337 of the Christmas tree 302 which is angled at approximately 45° relative to a through bore 334 of the Christmas tree 302. The feed-through port 337 provides access to an annulus 339 defined within the Christmas tree 302 between a tubing hanger 341 and an outer housing 343 of the Christmas tree 302. When the Christmas tree 302 is mounted at the head of an oil, gas and/or water well, such as the oil, gas and/or water well 4 shown in FIG. 1, the annulus 339 defined within the Christmas tree 302 is aligned with the annulus 3 of the well 4 so as to permit fluid flow communication therebetween.

The system 310 further comprises a coupler device 327. The coupler device 327 is connected to the transmitter 312 by a first electrical conductor 330, to the receiver 314 by a second electrical conductor 331 and to the antenna 325 by a third electrical conductor 329. In use, electrical signals propagate along the third electrical conductor 329 in both directions between the coupler device 327 and the antenna 325. The third electrical conductor 329 is sealed relative to the cap member 322 via a cable gland 332.

Unlike the antenna 225 of the system 210 of FIG. 6, the antenna 325 extends along the feed-through path 337 at an angle of approximately 45° relative to the main bore 334. In use, the antenna 325 transmits an electromagnetic signal downwardly directly into the annulus 339 defined within the Christmas tree 302 towards the annulus 3 of the oil and gas well 4 shown in FIG. 1. Similarly, a return electromagnetic signal propagating upwardly within the annulus 339 is received directly by the antenna 325. The direct downward transmission and reception of electromagnetic signals between the antenna 325 and the annulus 339 may reduce losses and/or noise on an electrical signal received at the receiver 314 compared with the losses and/or noise on an electrical signal received at the receiver 214 of the system 210 of FIG. 6 which relies upon reflection of transmitted and received electromagnetic signals through 90° from a deflector 245.

Figure 9:
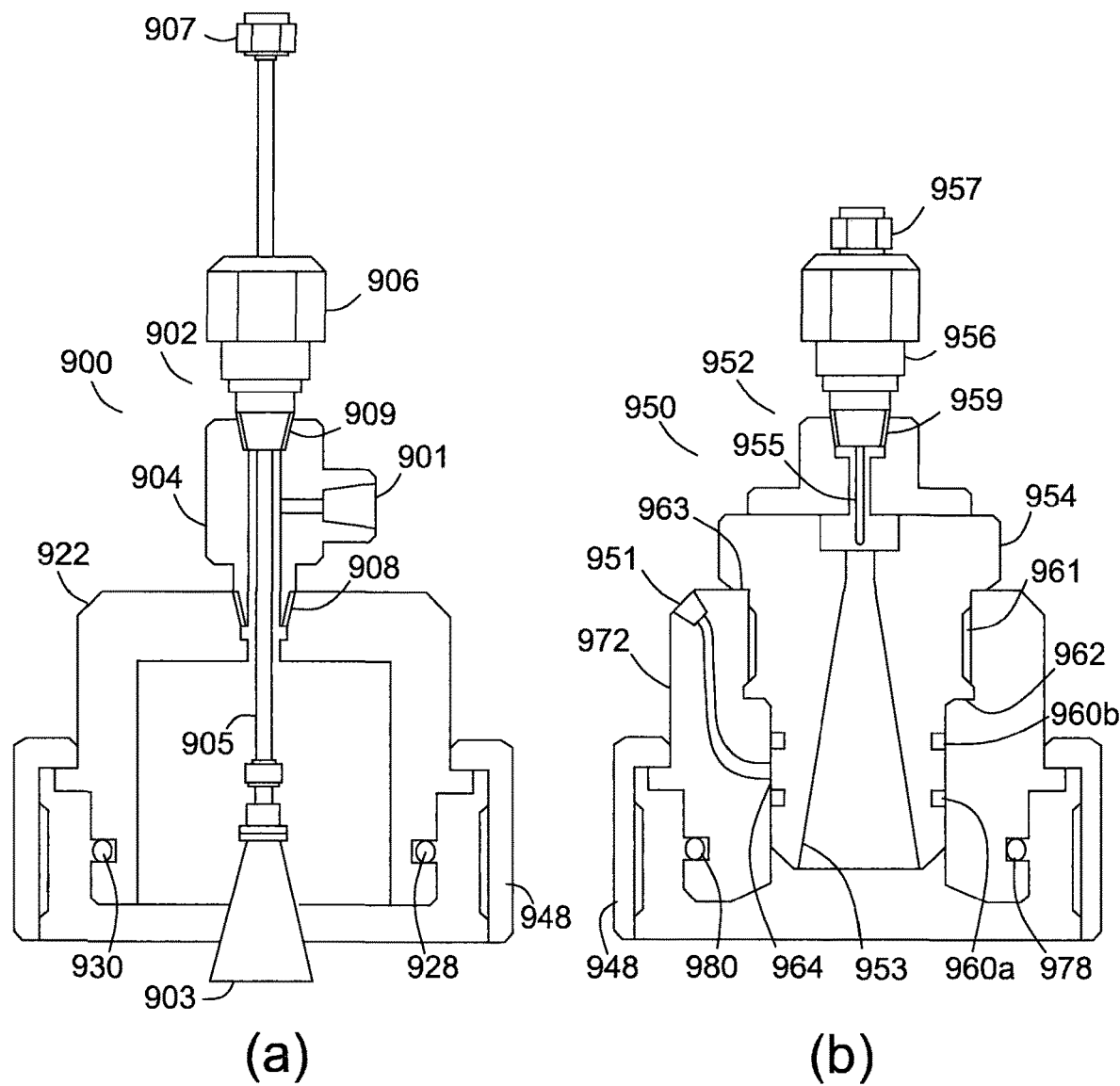
FIG. 9(a) shows a schematic cross section of a part of a Christmas tree at a wellhead of an oil, gas and/or water well including a cap arrangement with removable insert and pressure test port.
FIG. 9(b) shows a schematic cross section of a part of a Christmas tree at a wellhead of an oil, gas and/or water well including an alternative cap arrangement comprising a removable insert with dual seals, and a pressure test port.

FIG. 9(*a*) shows a cap arrangement 900 in which a cap member 922 is secured by a locking member 948. An O-Ring 930 is accommodated in an annular groove 928 around the cap member 922.

Removable insert 902 comprises an antenna horn 903 suspended by an electrical conductor 905, for example SiO2 cable. The electrical conductor passes through insert base 904 before entering and extending through pack off 906. The pack off 906 provides a seal around the electrical conductor 905. The electrical conductor 905 terminates in a K-type connector 907. Pack off 906 is attached to insert base 904 through a tapered thread connection 909, for example an NPT-thread. The removable insert 902 is attached to the cap member 922 via a tapered thread connection 908 between the insert base 904 and the cap member 922.

The insert base 904 also defines a pressure test port 901, which communicates around the electrical conductor 905 and into the wellhead infrastructure. The pressure test port 901 is equipped with a pressure gauge and bleed valve (not shown).

This arrangement allows the cap arrangement 900 to be pressure tested by applying pressure through the pressure test port 901. A valve on the wellhead device or wellhead infrastructure can be closed off to lessen the space which must be pressurised, and then pressure applied and held to test the integrity of the cap member seal 930 and the entire cap arrangement 922. This will include the threaded connection 908 between the insert base 904 and the cap member 922, the connection 909 between the pack off 906 and the insert base 904, and the integrity of the pack off 906 itself.

Additionally, the integrity of the assembled cap arrangement can be verified ex-situ prior to installation, to reduce the risk of failure of the pressure test in-situ.

FIG. 9(*b*) shows a cap arrangement 950 in which a cap member 972 is secured by a locking member 948. An O-Ring 980 is accommodated in an annular groove 978 around the cap member 972.

In this embodiment the removable insert 952 is considerably different, featuring an integrated antenna horn 953 and dual insert seals 960a, 960b. The insert base 954 fixes to the cap member 972 by a threaded connection 961. The pack off 956 is again connected to the insert base 954 through a tapered threaded connection 959. An electrical conductor 955 passes through the pack off 906 and terminates in a K-type connector 957.

The electrical conductor 955 and integrated antenna horn 953 work together to emit and receive electromagnetic signals down the bore. The electrical conductor 955 is configured to act as a feed to the waveguide at the end of the integrated antenna horn 953.

Due to the shoulders 962, 963 of the insert base 954, the integrated antenna horn 953 and the tapered thread 959 of the pack off 956, there is no way in which a component may fall into the well bore. This has the benefit of greatly reducing the risk when compared to suspended antenna designs, because if an antenna, for example a horn antenna, were to fall into the well it would have to be retrieved—a difficult, time consuming and costly exercise.

Cap member 972 defines a pressure test port 951 which communicates with the space 964 between insert seals 960a and 960b. This allows the integrity of both seals to be tested by only pressurising a small space 964, and without the need to provide a sealed environment below the cap arrangement. A pressure gauge and/or bleed valve can be attached to the pressure test port 951; once the integrity of the lower seal 960a is verified it is desirable but not essential to seal pressure test port 951. The embodiment shown in FIG. 9(b) allows the removable insert 952, and so the whole antenna assembly, to be removed from the cap arrangement, and another removable insert installed in its place. The integrity of the removable insert 952 itself can be verified offline, so all that needs to be done to verify the pressure integrity of the new removable insert 952 in-situ is the application of pressure through pressure test port 951. This pressurises the space 964 between the seals 960a, 960b, and does not require pressurisation of any other spaces.

In an example installation, the cap arrangement 950 is fitted with a removable insert 952 comprising an antenna assembly, and is pressure tested in a test rig. This testing includes applying pressure through cap pressure test port 951. The cap arrangement is then installed into a well and the integrity of the cap is verified according to normal operating procedures. After installation of the cap arrangement 950 it is desired to remove and replace the antenna assembly. A new removable insert 952 is installed, and a pressure test through pressure test port 951 is all that is required before well operations can continue.

Figure 10:
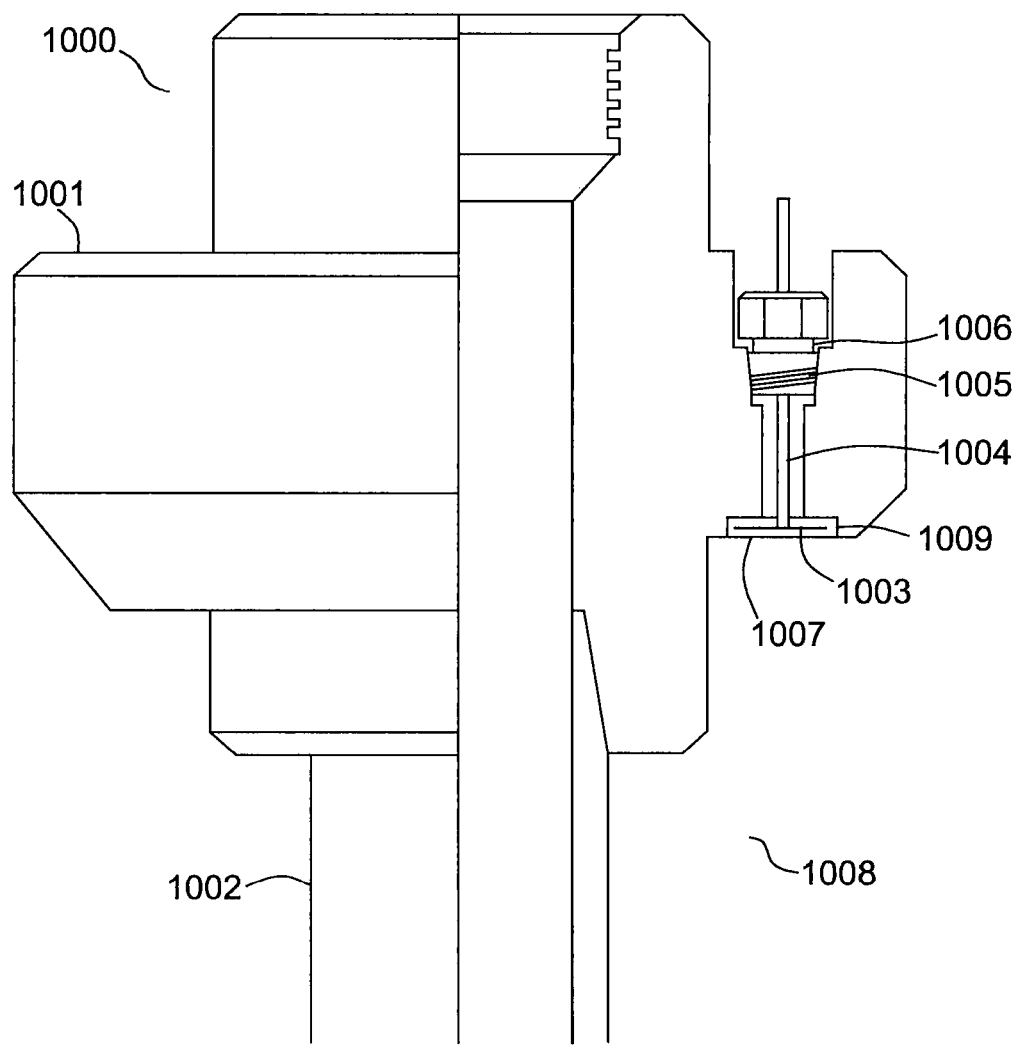
FIG. 10 shows a tubing hanger with a feedthrough and antenna.

FIG. 10 shows a system 1000 for providing an antenna 1003 at the underside of a tubing hanger 1001, from which tubing 1002 is suspended. In this way electromagnetic signals can be sent and/or received to or from the annulus 1008 of the bore. The tubing hanger defines a hole into which a feedthrough can be attached, in this case by a tapered threaded connection 1005. A pack off 1006 allows an electrical conductor 1004 to pass through the tubing hanger and connect to the antenna 1003.

The antenna shown here is a planar antenna, for example a linear, strip, spiral or patch antenna mounted in a recess 1009 of the tubing hanger. It will be appreciated that other antenna types could be used, for example a horn antenna integrally formed into the tubing hanger 1001.

A dielectric window 1007 underneath the antenna and flush with the outer surface of the tubing hanger 1001 allows electromagnetic signals to pass to and from the antenna. The window 1007 also provides another layer of pressure sealing, and further retains the antenna 1003.

Figure 11:
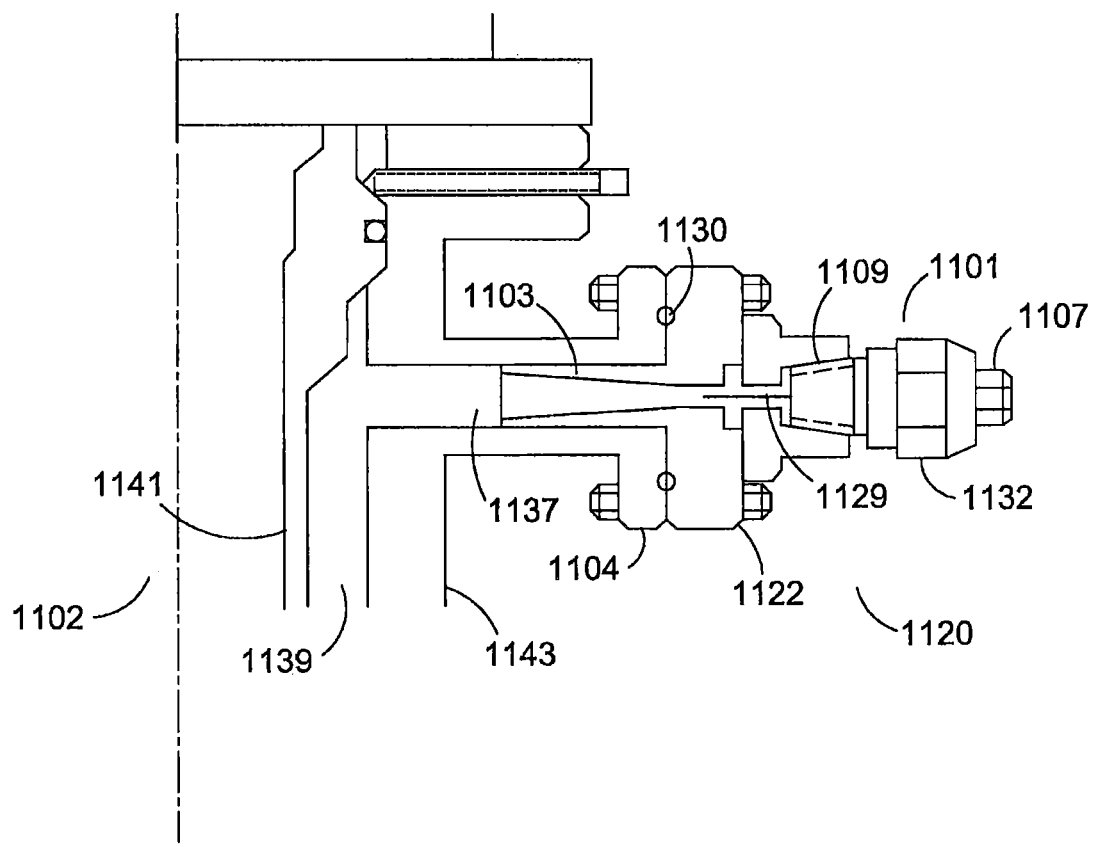
FIG. 11 shows a schematic cross-section of a part of a Christmas tree at a wellhead of an oil, gas and/or water well including a cap arrangement which utilises a lateral or side port.

FIG. 11 shows a cap arrangement 1120 which interfaces with a lateral or side port or path 1137 in an outer housing 1143 of a Christmas tree 1102. A cap member 1122 comprises a flange which matches a flange 1104 on the lateral or side port 1137. An O-ring 1130 provides a seal between the cap arrangement 1120 and the outer housing 1143.

The lateral or side port 1137 provides access to an annulus 1139 defined within the Christmas tree 1102 between a tubing hanger 1141 and the outer housing 1143 of the Christmas tree 1102. When the Christmas tree 1102 is mounted at the head of an oil, gas and/or water well, such as the oil, gas and/or water well shown in FIG. 1, the annulus 1139 defined within the Christmas tree 1102 is aligned with the annulus 3 of the well 4 so as to permit fluid flow communication therebetween.

An antenna horn 1103 is integrally formed into the cap member 1122, and works in cooperation with the electrical conductor 1129 in order to transmit and/or receive electromagnetic signals to and/or from the annulus 1139 of the Christmas tree 1102. The transmission and/or reception of electromagnetic signals to and/or from the annulus is achieved in a similar way to that shown in FIG. 6, with the signals being deflected by 90 degrees.

A removable insert 1101 comprises electrical conductor 1129, pack off 1132 and K-type connector 1107. The removable insert 1101 is attached to the cap member 1122 by a tapered threaded connection 1109, which also acts as a seal. The electrical conductor passes through the pack off 1132, and terminates in the K-type connector 1107. The pack off 1132 provides a seal around the electrical connector 1129.

Whilst it is not shown here, the cap arrangement 1120 can also define a pressure test port for testing the integrity of the cap arrangement. This pressure test port may be similar to that shown in FIG. 9(a) or FIG. 9(b). Similarly, there can be provided dual seals between the removable insert 1101 and the cap member 1122, to allow a pressure test port to operate between these seals in a similar manner to that shown in FIG. 9(b).

One skilled in the art will appreciate that various modifications of the systems and methods described above may be possible without departing from the scope of the present invention. For example, at the least some of the functions of the transmitter, receiver and controller may be performed by a vector network analyser (VNA) or similar type of measuring apparatus.

The particular range of frequencies of the electromagnetic signals used may depend on the geometry of one or more of the downhole tubulars in the well. The particular range of frequencies used may depend on the measurement accuracy, resolution and/or range. The frequencies used may be 1 GHz-100 GHz, 2 GHz to 50 GHz, 4 GHz to 40 GHz, or 20 to 60 GHz.

The method(s) may comprise determining the dielectric properties of the surface reflecting the transmitted electromagnetic signals.

The method(s) may comprise determining the distance between surface and a downhole feature from a frequency of the received electromagnetic signal.

The method(s) may comprise determining the distance between surface and the downhole feature by comparing a frequency of the received electromagnetic signal to a frequency of the transmitted electromagnetic signal.

The method(s) may comprise determining a nature of the downhole feature from a configuration of one or more reflectance features in the time domain and/or frequency domain reflectance trace.

The method(s) may comprise determining a nature of the downhole feature from the size and/or shape of a reflectance profile or peak in the time and/or frequency domain reflectance trace, magnitude frequency spectrum and/or phase frequency spectrum.

The method(s) may comprise determining a dielectric property of the downhole feature from the received or reflected electromagnetic signal. The dielectric property may be permittivity, dielectric constant or the like. For example, the dielectric property may be permittivity across a range of frequencies. Dielectric spectroscopy techniques may be applied to determine the dielectric property from the received electromagnetic signal. The dielectric spectroscopy techniques may utilise the time and/or frequency domains. The time domain reflectance trace, magnitude frequency spectrum and/or phase frequency spectrum may be used to determine the dielectric property. Time Domain Reflectometry (TDR) or Time Domain Spectroscopy (TDS) may be used to determine the dielectric property from the received electromagnetic signal.

The method(s) may comprise determining a dielectric property of a material comprised within or present at the downhole feature. The methods may comprise determining a dielectric property of a material present at an interface of the downhole feature, for example, at a gas-oil or water-oil interface. The received electromagnetic signal may comprise a reflected signal from the material. The profile, shape and/or amplitude of the reflected signal from the material may allow the determination of the dielectric property of that material. The methods may comprise using dielectric spectroscopy in the time and/or frequency domain(s) to determine the dielectric property, for example the methods may comprise using TDR or TDS techniques. The methods may allow fast and accurate identification of the composition of one or more materials comprised within or present at the downhole feature.

The method(s) may comprise mixing at least a portion of a transmitted signal with at least a portion of a received signal to produce a beat signal.

The method(s) may comprise mixing at least a portion of the transmitted electromagnetic signal with at least a portion of the received electromagnetic signal to produce a beat electromagnetic signal.

The method(s) may comprise mixing at least a portion of an electrical signal transmitted to an antenna to produce the transmitted electromagnetic signal with at least a portion of a received electrical signal produced on receipt of the received electromagnetic signal at an antenna to produce a beat electrical signal.

The method(s) may comprise demodulating the beat signal.

The method(s) may comprise determining the distance between surface and the downhole feature from a magnitude of the demodulated beat signal.

Such a frequency-modulated continuous wave (FMCW) method may be simpler and, therefore, more cost effective to implement than a Frequency Domain Reflectometry (FDR) method such as that described with reference to FIGS. 1 to 8.

The system may be used to detect and/or measure a distance between surface and a downhole feature other than a fluid interface. The downhole feature may be spatially localised within the well. The downhole feature may comprise a discontinuity. The downhole feature may comprise an interface. The downhole feature may comprise a change in an inner diameter of a downhole tubular. The downhole feature may comprise a change in a wall thickness of a downhole tubular. The downhole feature may comprise a coupling between two downhole tubulars. The downhole feature may comprise at least a part of a downhole tool. The downhole feature may comprise at least a part of a downhole valve. The downhole feature may comprise at least part of a downhole valve member. The downhole feature may comprise a downhole object, obstruction, impairment, restriction, occlusion or the like. The downhole feature may comprise at least one of particulates, sand, hydrates, wax, scale, corrosion and the like within the well. The downhole feature may be deposited on a surface of a downhole tubular. The downhole feature may be spatially distributed. The rate of attenuation of reflectance with distance may provide an indication of the nature of a spatially distributed downhole feature.

The method(s) may comprise altering the electromagnetic signals received for each of the different frequencies to correct or account for any differences in propagation speed of the different frequencies. The sequential transmission of the plurality of different frequencies may allow or facilitate such correction. The controller and/or the transmitter and receiver may be configured for this purpose. For example, the controller may be programmed with software which implements an algorithm to alter the electromagnetic signals received for each of the different frequencies to correct or account for any differences in propagation speed of the different frequencies. Such correction may provide enhanced distance measurement accuracy, resolution, sensitivity and/or range relative to known distance measurement methods.

The foregoing methods may be combined with other measurement techniques such as acoustic measurement techniques to provide additional information about a downhole feature and/or a downhole environment. The Christmas tree and/or the well may comprise one or more acoustic transmitters and one or more acoustic receivers for this purpose.

The foregoing methods may be used with any kind of wellhead arrangement. For example, the foregoing methods may be used with a wellhead device or wellhead infrastructure other than a Christmas tree.

The invention claimed is:

1. A method for detecting a downhole feature in a well, the method comprising:
    sealing the well,
    providing a wellhead device at a head of the well, the wellhead device comprising a transmitter antenna therewithin at a first position located at surface, and a receiver antenna therewithin at a second position located at surface,
    and then:
    transmitting an electromagnetic signal from the transmitter antenna through a space to the downhole feature,
    receiving an electromagnetic signal at the receiver antenna after reflection of the transmitted electromagnetic signal from the downhole feature and after propagation of the electromagnetic signal through the space,
    wherein the space comprises a bore provided within a first downhole tubular or an annulus between first and second downhole tubulars.

2. A method as claimed in claim 1, comprising:
installing completion infrastructure in the well and/or at a head of the well or wellhead before transmitting the electromagnetic signal.

3. A method as claimed in claim 1, comprising:
installing a valve or valve arrangement at a head of the well or wellhead before transmitting the electromagnetic signal.

4. A method as claimed in claim 1, comprising:
installing the wellhead device which comprises a Christmas tree at a head of the well or wellhead before transmitting the electromagnetic signal.

5. A method as claimed in claim 1, comprising:
pressurising the well before transmitting the electromagnetic signal.

6. A method as claimed in claim 1, comprising:
exposing the well to a fluid pressure existing within a sub-surface formation located adjacent to the well before transmitting the electromagnetic signal.

7. A method as claimed in claim 1, comprising:
producing a fluid from the well before, during and/or after transmitting the electromagnetic signal.

8. A method as claimed in claim 1, comprising:
injecting a fluid into the well before, during and/or after transmitting the electromagnetic signal.

9. A method as claimed in claim 1, wherein the well comprises a completed oil, gas and/or water well.

10. A method as claimed in claim 1, wherein the well is configured for production, injection, observation or disposal of oil, gas and/or water.

11. A method as claimed in claim 1, wherein the wellhead device is a Christmas tree.

12. A method as claimed in claim 1, wherein the well comprises a tubing string or production tubing provided within the well and the space is provided within the tubing string or production tubing.

13. A method as claimed in claim 1, comprising:
determining a distance between surface and the downhole feature from the transmitted and received electromagnetic signals.

14. A method as claimed in claim 1, comprising:
determining a rate of change of distance between surface and the downhole feature from the transmitted and received electromagnetic signals.

15. A method as claimed in claim 1, wherein the downhole feature is spatially localised within the well.

16. A method as claimed in claim 1, wherein the downhole feature comprises a fluid interface selected from one of a gas-liquid interface, a gas-gas interface and a liquid-liquid interface.

17. A method as claimed in claim 16, comprising:
repeatedly determining a distance between surface and the fluid interface so as to permit real-time or dynamic measurements of a level of the fluid interface.

18. A method as claimed in claim 16, comprising:
controlling a downhole device, a downhole pump, a gas-lift pump or an Electric Submersible Pump (ESP) according to a determined distance between surface and the fluid interface.

19. A method as claimed in claim 16, comprising:
using a determined distance between surface and a fluid interface, a known pressure at surface within the well, and a known specific gravity of any fluids located between surface and the fluid interface to determine a pressure at the fluid interface.

20. A method as claimed in claim 1, wherein the downhole feature comprises a gas-oil interface, an oil-water interface or a gas-water interface.

21. A method as claimed in claim 1, wherein the downhole feature comprises at least one of:
a change in an inner diameter of one of the downhole tubulars;
a change in a wall thickness of one of the downhole tubulars;
a coupling between two downhole tubulars;
at least a part of a downhole tool;
at least a part of a downhole valve;
at least part of a downhole valve member;
a downhole object, obstruction, impairment, restriction, occlusion;
at least one of particulates, sand, hydrates, wax, scale, corrosion within the well; and
a deposit on a surface of one of the downhole tubulars.

22. A method as claimed in claim 1, wherein the transmitted electromagnetic signal has a frequency in a frequency range of 1 GHz to 100 GHz, 2 GHz to 50 GHz, 4 GHz to 40 GHz, or 20 to 60 GHz.

23. A method as claimed in claim 1, comprising:
transmitting the electromagnetic signal with at least 10 different frequencies, at least 100 different frequencies, at least 1,000 different frequencies, or at least 10,000 different frequencies.

24. A method as claimed in claim 23, comprising:
altering the electromagnetic signals received for each of the different transmitted frequencies to correct or account for any differences in propagation speed of the different frequencies.

25. A method as claimed in claim 1, comprising:
sequentially varying a frequency of the transmitted electromagnetic signal.

26. A method as claimed in claim 1, comprising:
measuring a magnitude of the received electromagnetic signal as a function of frequency;
measuring a phase of the received electromagnetic signal as a function of frequency;
measuring a magnitude of the transmitted electromagnetic signal as a function of frequency; and/or
measuring a phase of the transmitted electromagnetic signal as a function of frequency.

27. A method as claimed in claim 26, comprising:
determining a magnitude frequency spectrum from the magnitude of the received electromagnetic signal and the magnitude of the transmitted electromagnetic signal as a function of frequency; and/or
determining a phase frequency spectrum from the phase of the received electromagnetic signal and the phase of the transmitted electromagnetic signal as a function of frequency.

28. A method as claimed in claim 27, comprising:
using a Vector Network Analyser (VNA) to determine the magnitude and/or the phase frequency spectrum.

29. A method as claimed in claim 27, comprising:
determining a time domain reflectance trace from the magnitude frequency spectrum and the phase frequency spectrum; and
determining a distance between surface and the downhole feature from the time domain reflectance trace.

30. A method as claimed in claim 1, comprising:
receiving an electromagnetic signal at surface after reflection of the transmitted electromagnetic signal from a plurality of downhole features within the well.

31. A method as claimed in claim 30, wherein each of the downhole features comprises a different fluid interface.

32. A method as claimed in claim 30, comprising:
determining a distance between surface and at least two of a gas-oil interface, an oil-water interface, and a gas-water interface.

33. A method as claimed in claim 1, further comprising:
inserting an antenna of, or at least partially defined by, the cap arrangement through an opening of the wellhead device or wellhead infrastructure into an internal path of the wellhead device or wellhead infrastructure; and
using the cap arrangement to seal the opening of the wellhead device or wellhead infrastructure.

34. A method as claimed in claim 33, comprising:
closing a valve of the wellhead device or wellhead infrastructure so as to isolate the internal path of the wellhead device or wellhead infrastructure from well pressure before inserting the antenna through the opening of the wellhead device or wellhead infrastructure; and
opening the valve so as to re-expose the internal path of the wellhead device or wellhead infrastructure to well pressure after using the cap arrangement to seal the opening of the wellhead device or wellhead infrastructure.

35. A method as claimed in claim 34, comprising:
applying pressure through a pressure test port defined or provided by the cap arrangement so as to test the pressure integrity of the seal provided by the cap arrangement before opening the valve so as to re-expose the internal path of the wellhead device or wellhead infrastructure to well pressure.

36. A method as claimed in claim 1, further comprising:
applying pressure through a pressure test port at least partially defined or provided by a cap arrangement for the wellhead device or wellhead infrastructure.

37. A method as claimed in claim 36, comprising using the cap arrangement to seal an opening of the wellhead device or wellhead infrastructure before applying pressure through the pressure test port.

38. A method as claimed in claim 37, comprising:
closing a valve of the wellhead device or wellhead infrastructure so as to isolate an internal path of the wellhead device or wellhead infrastructure from well pressure before using the cap arrangement to seal the opening of the wellhead device or wellhead infrastructure; and
opening the valve so as to re-expose the internal path of the wellhead device or wellhead infrastructure to well pressure after applying pressure through the pressure test port.

39. A method as claimed in claim 1, wherein the first downhole tubular is selected from one of a production tubing, a work string, and a drill string.

40. A method as claimed in claim 1, wherein the first downhole tubular is selected from one of a production tubing, a work string, and a drill string, and the second downhole tubular is selected from one of a casing, and a liner.

41. A method as claimed in claim 1, wherein the transmitter and receiver antennas are horn antennas.

42. A system for use in or for detecting a downhole feature in a well, the system comprising:
a wellhead device at a head of the well, the wellhead device comprising a transmitter antenna therewithin at a first position located at surface, and a receiver antenna therewithin at a second position located at surface; a valve or seal for sealing a well; wherein
the transmitter antenna is arranged for transmitting an electromagnetic signal from the first position through a space;
the receiver antenna is arranged for receiving an electromagnetic signal at the second position after reflection of the transmitted electromagnetic signal from a downhole feature and after propagation of the electromagnetic signal through the space;
wherein the space comprises a bore provided within a first downhole tubular or an annulus between first and second downhole tubulars.

43. A system as claimed in claim 42, comprising completion infrastructure in the well and/or at a head of the well.

44. A system as claimed in claim 42, wherein the wellhead device is a Christmas tree at a head of the well.

45. A system as claimed in claim 42, comprising a controller for determining a distance between surface and the downhole feature from the transmitted and received electromagnetic signals.

46. A system as claimed in claim 42, wherein the transmitter antenna is configured to transmit an electromagnetic signal along a direction lateral to a longitudinal direction of the first downhole tubular prior to being deflected downwardly along the longitudinal direction.

47. A system as claimed in claim 42, wherein the receiver antenna is configured to receive an electromagnetic signal along a direction lateral to a longitudinal direction of the first downhole tubular after being deflected from an upward path along the longitudinal direction.

48. A system as claimed in claim 42, comprising a transmitter for transmitting an electrical signal to the transmitter antenna and a receiver for receiving an electrical signal from the receiver antenna.

49. A system as claimed in claim 48, wherein the transmitter antenna and the receiver antenna are the same antenna.

50. A system as claimed in claim 49, comprising a coupler, a splitter, or a circulator for directing the electrical signal received from the antenna to the receiver and for directing the electrical signal transmitted from the transmitter to the antenna.

51. A system as claimed in claim 42, comprising a cap arrangement which is configured for sealing an opening of a wellhead device or an opening of wellhead infrastructure located at or adjacent a head of the well whilst also permitting transmission of electrical signals between an environment external to the well and the transmitter and receiver antennas when located within the well.

52. A system as claimed in claim 51, wherein the opening comprises a main bore or a side port of the wellhead device or the wellhead infrastructure.

53. A system as claimed in claim 51, wherein the cap arrangement is configured to be attached to the wellhead device or the wellhead infrastructure.

54. A system as claimed in claim 51, wherein the cap arrangement defines or provides at least one pressure test port.

55. A system as claimed in claim 51, wherein the cap arrangement comprises or at least partially defines an antenna for transmitting and/or receiving the electromagnetic signals.

56. A system as claimed in claim 55, comprising a cap member and an electrical conductor extending from the antenna through the cap member.

57. A system as claimed in claim 56, wherein the electrical conductor and the cap member are sealed relative to one another.

58. A system as claimed in claim 57, wherein the cap member at least partially defines and/or comprises a flange or a tubing hanger.

59. A system as claimed in claim 55, comprising a window which separates the antenna from a well bore or a well annulus and which is transparent to an electromagnetic signal transmitted from and/or received by the antenna.

60. A system as claimed in claim 59, wherein the window is configured to seal the antenna from well pressure.

61. A system as claimed in claim 55, wherein the cap arrangement comprises or at least partially defines separate transmitter and receiver antennas.

62. A system as claimed in claim 55, wherein the cap arrangement is configured for sealing an opening defined by the wellhead device or wellhead infrastructure.

63. A system as claimed in claim 55, wherein the cap arrangement is attachable to the wellhead device or wellhead infrastructure.

64. A system as claimed in claim 42, wherein the transmitter and receiver antennas are horn antennas.

* * * * *